US010191745B2

(12) United States Patent
Ko et al.

(10) Patent No.: US 10,191,745 B2
(45) Date of Patent: Jan. 29, 2019

(54) OPTIMIZED CALL-RETURN AND BINARY TRANSLATION

(71) Applicant: Intel Corporation, Santa Clara, CA (US)

(72) Inventors: Hou-Jen Ko, West Lafayette, IN (US); Girish Venkatasubramanian, Mountain View, CA (US); Jason Agron, San Jose, CA (US); Tyler Sondag, Newart, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/475,389

(22) Filed: Mar. 31, 2017

(65) Prior Publication Data
US 2018/0285113 A1 Oct. 4, 2018

(51) Int. Cl.
G06F 9/45 (2006.01)
G06F 9/30 (2018.01)

(52) U.S. Cl.
CPC ........ *G06F 9/30174* (2013.01); *G06F 9/3016* (2013.01)

(58) Field of Classification Search
CPC .................................................. G06F 9/30174
USPC .................................................. 717/135–141
See application file for complete search history.

(56) References Cited

U.S. PATENT DOCUMENTS

| 5,842,017 | A  | * | 11/1998 | Hookway | .................. | G06F 8/52 |
|---|---|---|---|---|---|---|
|   |   |   |   |   |   | 717/158 |
| 6,021,469 | A  | * | 2/2000 | Tremblay | ............ | G06F 9/30021 |
|   |   |   |   |   |   | 711/125 |
| 6,954,923 | B1 | * | 10/2005 | Yates, Jr. | ............ | G06F 9/30174 |
|   |   |   |   |   |   | 717/130 |
| 7,047,394 | B1 | * | 5/2006 | Van Dyke | ........... | G06F 9/30167 |
|   |   |   |   |   |   | 703/26 |
| 7,421,686 | B2 | * | 9/2008 | Souloglou | .................. | G06F 8/44 |
|   |   |   |   |   |   | 717/136 |

(Continued)

OTHER PUBLICATIONS

Liu et al, "Exploiting Asymmetric SIMD Register Configurations in ARM-to-x86 Dynamic Binary Translation", IEEE, pp. 343-355, 2017.*

(Continued)

*Primary Examiner* — Anil Khatri
(74) *Attorney, Agent, or Firm* — Alliance IP, LLC

(57) ABSTRACT

In one example a processor includes a region formation engine to identify a region of code for translation from a guest instruction set architecture to a native instruction set architecture. The processor also includes a binary translator to translate the region of code. The region formation engine is to perform aggressive region formation, which includes forming a region across a boundary of a return instruction. The translated region of code is to prevent a side entry into the translated region of code at a translated return target instruction included in the translated region of code. In more specific examples, performing aggressive region formation includes a region formation grow phase and a region formation cleanup phase. In the grow phase priority may be given to growing complete paths from a call target to a corresponding return. The region formation cleanup phase may comprise eliminating call targets that are not reachable.

25 Claims, 24 Drawing Sheets

(56) References Cited

U.S. PATENT DOCUMENTS

| | | | | |
|---|---|---|---|---|
| 7,543,284 | B2* | 6/2009 | Bolton | G06F 8/4435 717/148 |
| 8,443,343 | B2* | 5/2013 | Blomstedt | G06F 8/433 717/136 |
| 8,479,176 | B2* | 7/2013 | Ottoni | G06F 9/45525 717/136 |
| 8,505,002 | B2* | 8/2013 | Yehia | G06F 9/30036 717/140 |
| 8,510,756 | B1* | 8/2013 | Koryakin | G06F 9/45558 718/1 |
| 8,776,030 | B2* | 7/2014 | Grover | G06F 8/456 717/136 |
| 8,966,457 | B2* | 2/2015 | Ebcioglu | G06F 17/5045 716/105 |
| 8,984,498 | B2* | 3/2015 | Grover | G06F 8/456 717/144 |
| 9,207,960 | B2* | 12/2015 | Abdallah | G06F 9/30174 |
| 9,710,387 | B2* | 7/2017 | Abdallah | G06F 12/0875 |
| 9,733,942 | B2* | 8/2017 | Abdallah | G06F 9/30174 |
| 9,798,873 | B2* | 10/2017 | Glew | G06F 21/52 |
| 9,921,842 | B2* | 3/2018 | Abdallah | G06F 9/322 |

OTHER PUBLICATIONS

Rokicki et al, "Hardware-Accelerated Dynamic Binary Translation", IEEE, pp. 1062-1067, 2017.*

Michel et al, "Dynamic Binary Translation of VLIW Codes on Scalar Architectures", IEEE Transactions on Computer-Aided Design of Integrated Circuits and Systems, vol. 36, No. 5, pp. 789-800, 2017.*

Qi et al, "Multi-Granularity Memory Mirroring via Binary Translation in Cloud Environments", IEEE Transactions on Network and Service Management, vol. 11, No. 1, pp. 36-45, 2014.*

Kyle et al, "Efficiently Parallelizing Instruction Set Simulation of Embedded Multi-Core Processors Using Region-based Just-in-Time Dynamic Binary Translation", ACM, pp. 21-30, 2012 (Year: 2012).*

Hsu et al, "Improving Dynamic Binary Optimization Through Early-Exit Guided Code Region Formation", ACM, pp. 23-32, 2013 (Year: 2013).*

Hawkins et al, Optimizing Binary Translation of Dynamically Generated Code, IEEE, pp. 68-78, 2015 (Year: 2015).*

Kumar et al, "Transparent Debugging of Dynamically Optimized Code", IEEE, pp. 275-286, 2009 (Year: 2009).*

* cited by examiner

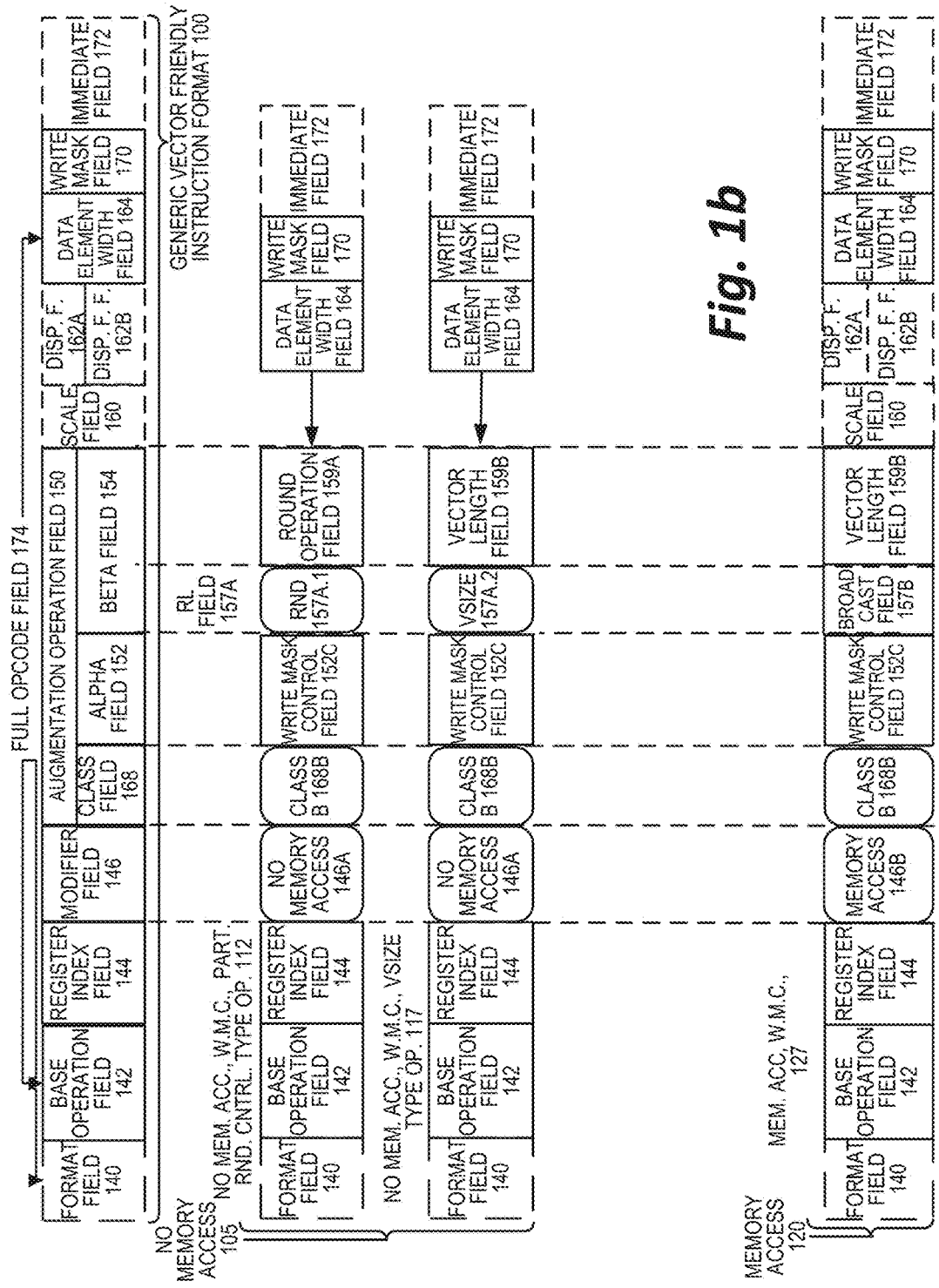

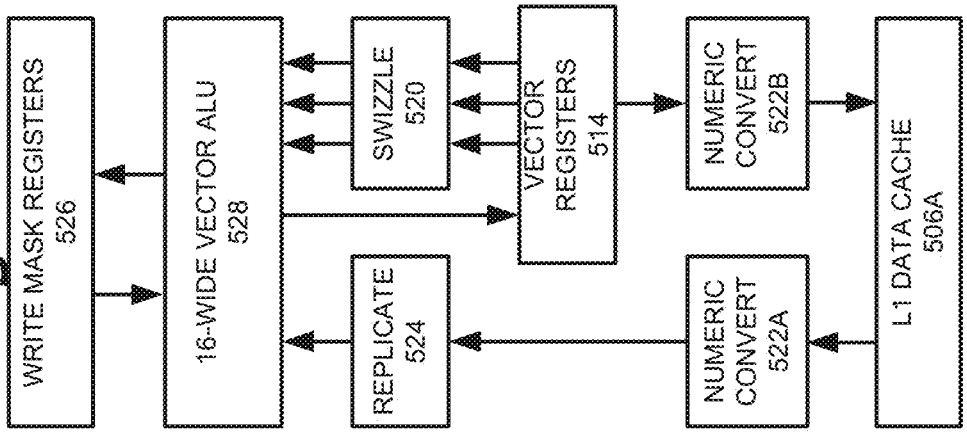
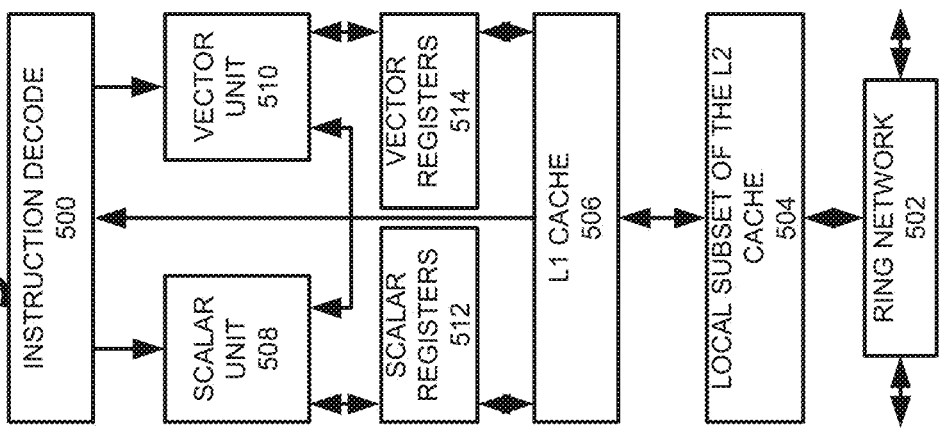

OPTIMIZED CALL-RETURN AND BINARY TRANSLATION

FIELD OF THE SPECIFICATION

This disclosure relates in general to the field of semiconductor devices, and more particularly, though not exclusively to a system and method for optimizing CALL/RET mechanisms.

BACKGROUND

Multiprocessor systems are becoming more and more common. In the modern world, compute resources play an ever more integrated role with human lives. As computers become increasingly ubiquitous, controlling everything from power grids to large industrial machines to personal computers to light bulbs, the demand for ever more capable processors increases.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIGS. 1a-1b are block diagrams illustrating a generic vector-friendly instruction format and instruction templates thereof according to one or more examples of the present specification.

FIGS. 5a-5b illustrate a block diagram of a more specific in-order core architecture, which core would be one of several logic blocks (including other cores of the same type and/or different types) in a chip according to one or more examples of the present specification.

EMBODIMENTS OF THE DISCLOSURE

Figure 1A:
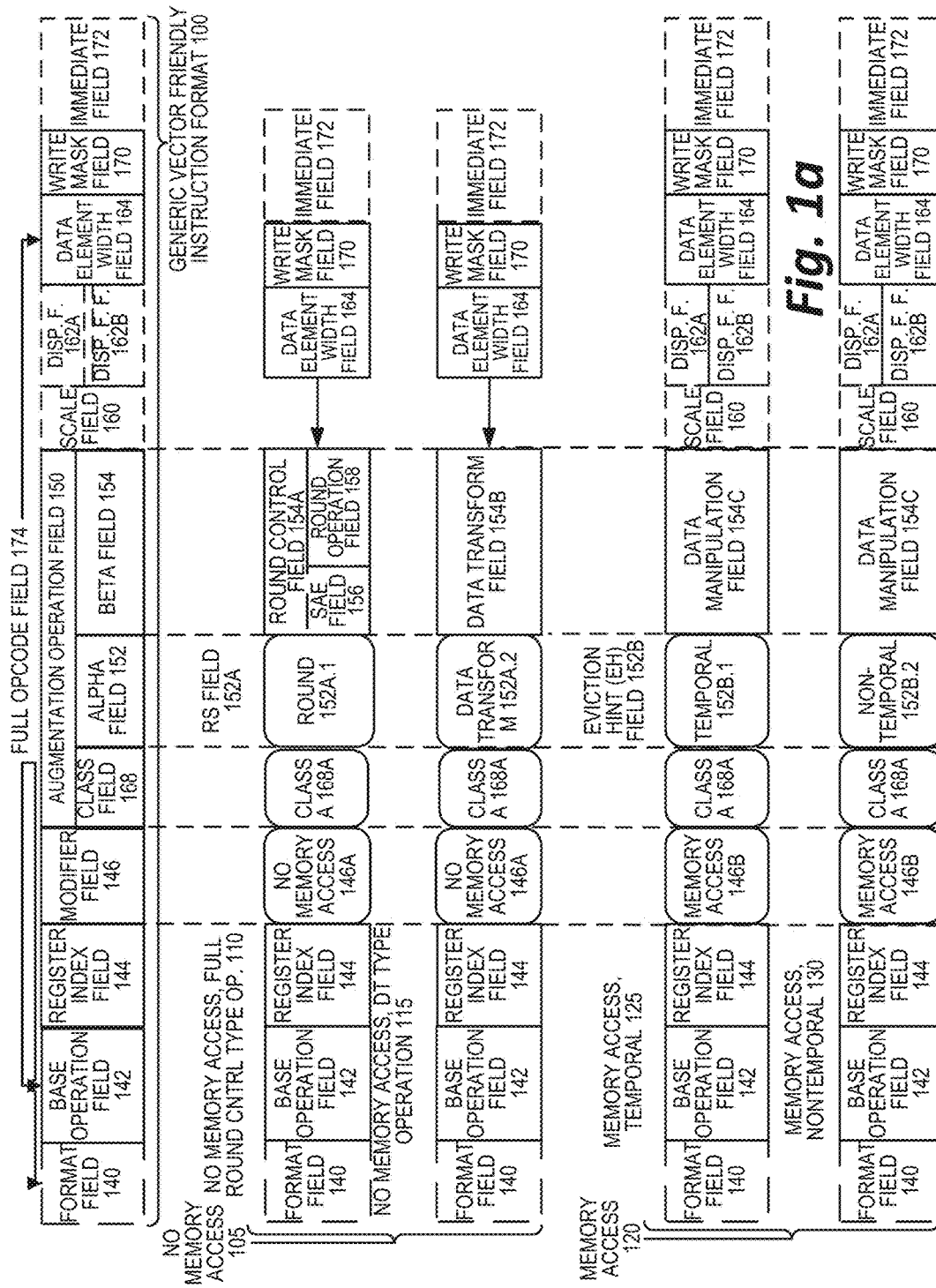

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions (that is, instructions that are provided to the processor for execution) as opposed to micro-instructions or micro-ops (that is, the result of a processor's decoder decoding macro-instructions). The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale, Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software and/or programmer and the manner in which instructions specify registers. Where a distinction is required, the adjectives "logical," "architectural," or "software visible" will be used to indicate registers and/or files in the register architecture, while different adjectives will be used to designate registers in a given microarchitecture (e.g., physical register, reorder buffer, retirement register, register pool).

An instruction set includes one or more instruction formats. A given instruction format defines various fields (number of bits, location of bits) to specify, among other things, the operation to be performed and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are fewer fields included), and/or defined to have a given field interpreted differently. A given instruction is expressed using a given instruction format (and, if defined, in a given one of the instruction templates of that instruction format) and specifies the operation and the operands. An instruction stream is a specific sequence of instructions, where each instruction in the sequence is an occurrence of an instruction in an instruction format (and, if defined, a given one of the instruction templates of that instruction format).

In order for a pipelined microprocessor to operate efficiently, an instruction fetch unit at the head of the pipeline must continually provide the pipeline with a stream of microprocessor instructions. However, conditional branch instructions within an instruction stream prevent the instruction fetch unit from fetching subsequent instructions until the branch condition is fully resolved. In a pipelined microprocessor, the branch condition will not be fully resolved until the branch instruction reaches an instruction execution stage near the end of the microprocessor pipeline. Accordingly, the instruction fetch unit will stall because the unresolved branch condition prevents the instruction fetch unit from knowing which instructions to fetch next.

To alleviate this problem, many pipelined microprocessors use branch prediction mechanisms that predict the existence and the outcome of branch instructions within an instruction stream. The instruction fetch unit uses the branch predictions to fetch subsequent instructions. When a branch prediction mechanism predicts the outcome of a branch instruction and the microprocessor executes later instructions along the predicted path, the microprocessor is said to have "speculatively executed" along the predicted instruction path. During speculative execution the microprocessor is performing useful processing only if the branch instruction was predicted correctly.

If the branch prediction mechanism mispredicts the branch instruction, the microprocessor is executing instructions down the wrong path and therefore accomplishes nothing. When the microprocessor eventually detects the mispredicted branch, the microprocessor must flush the instructions that were speculatively fetched from the instruction pipeline and restart execution at the correct address.

In general terms, binary translation takes a complex instruction set and translates it into a more optimization-friendly instruction set. Indeed, modern instructions may be similar to procedure calls, including the presence of multiple operands. The binary translator can reduce complex instructions to a series of microcode operations that can emulate a RISC (reduced instruction set computer)-like instruction set, among other embodiments.

However, binary translation is more than simply identifying a corresponding RISC instruction or instructions for a complex instruction set computing (CISC) instruction and creating a macro replacement for that instruction. One goal of a binary translator is to keep the pipeline full and to help reduce the number of cache misses and mispredicts, which are costly in terms of processing time. Indeed, modern binary translators are similar to optimizing compilers, in that they find ways to optimize "chunks" code to reduce latency and increase efficiency.

An illustrative dynamic binary translation (DBT) processor may translate guest instruction set architecture (ISA) code to state-equivalent host ISA code in a process known as translation. The DBT processor may optimize the translation and store it in a translational cache (TCache), and execute the code to achieve power and performance results. To this end, a binary translator in a modern processor may identify "regions" of code and perform an optimized translation of each region to ensure the best execution. Identifying code regions is, itself, a nontrivial task. In the first place, the more aggressively the binary translator optimizes a region, the less portable that translation becomes. If a nonaggressive optimization is used, then the translation of a region of code may be only loosely coupled to its surrounding context, so that other parts of the code can access it via "side entry" (i.e., an entry point other than the "top" of the code region, such as at a CALL boundary). But aggressive region formation and optimization may invalidate assumptions that enable correct side entry. Aggressive region formation can include any region formation that exceeds traditional region formation limits, such as forming larger regions than is commonly permissible, and forming regions across RET boundaries.

For example, a particular CALL may not change a value within the procedure call, meaning that certain instructions may be "hoisted" to an earlier part of the code, perhaps to even before the CALL instruction, or optimized out completely. But this assumption may not hold for other CALLs to the same procedure, which may indicate that side entry to the procedure is inhibited. In that case, the optimization process makes static assumptions that classify as incorrect side entry access from any location except a well-defined point "preceding" the optimization and/or hoisting point.

Consider, for example, a commonly used subroutine, such as memcpy( ), which copies memory from one location to another. If the binary translator includes a large region of code that includes the memcpy function, and aggressively optimizes that large region, then the translation of memcpy( ) may not be accessible to other portions of the software. However, if a less aggressive optimization is used, and if the translation of memcpy( ) is treated as a modular unit, then an entry point can be created to the translation at the memcpy( ) function, and other portions of the code may be able to use that entry point instead of entering at the beginning of the region, which may include other portions of the translation.

But if, in aggressive region formation, portions of memcpy( ) are hoisted up or even optimized out completely, then the portability of the translation may be broken. In this case, "side entry" points should be eliminated.

This trade-off between portability and optimization of a translation has resulted in certain limits in region formation. For example, in many existing systems, a region may not be defined that crosses the boundary of a call return (CALL/ RET). This is because after the CALL/RET, branch prediction can break down, and optimizations can interfere with the execution of other parts of the software. Branch prediction breakdown can also occur due to RETs that are indirect branches, whose targets cannot necessarily be statically predicted by an optimizer.

Advantageously, the present specification provides for inlining and optimizing code containing call and return sequences in the context of dynamic binary translation (DBT). Embodiments of the present specification include techniques that allow more aggressive formation of translation regions. These translation regions may even cross over the return boundary of a CALL/RET as described in more detail below. There is also disclosed herein a novel dual return stack buffer (DRSB) with a "LOCAL" field. This DRSB, which is a hardware-based stack often built with static random access memory (SRAM) or floating point operations (FLOPs), ensures that if an aggressive optimization is performed that possibly breaks control flow, side entries into the procedure from other parts of the code (for which the assumptions that drove the optimization may not be true) are blocked. For example, if a non-local procedure call attempts to enter a procedure for which the LOCAL bit is set, an error condition is raised. In that case, program flow may continue, but may default to a non-optimized version of the code.

As discussed above, in the case of translating chunks or regions of code that contain CALL and RET instructions, there are some barriers to providing optimizations such as hoisting code from the return target (RET_TGT) across the return instruction. It is sometimes considered "good practice" that the call, the call body (at least one control flow path starting from the target of the call to the return), as well as the RET_TGT should all be included in the same translation. There may also be side entry point restrictions. Many optimizations involve assuming a certain path is being executed. For example, the assumption may be that dynamic control flow in the translation must begin at or before the translated equivalent of the CALL instruction (CALL'), and should not exit translation until after the translated equivalent of the RET target (RET_TGT').

If the translation has a side entry point (or in other words, a point at which the translation may be entered other than the top), such as RET_TGT', then the path assumptions may not be valid because the dynamic control flow can reach RET_TGT' without executing CALL'. Thus, having RET_TGT' as a side entry is a barrier for optimizations across RET_TGT'.

The teachings of the present specification improve inclusion and eliminate entry point restraints, thereby enabling a more optimized translation of the CALL/RET sequence. Various embodiments achieve this with mechanisms including:

a. Aggressive region formation to ensure inclusion—in other words, the CALL, call target return, and RET_TGT are all included in the same translation.
 b. Translating the call and return instructions so that RET_TGT' does not become a side entry point into the translation. This can be done by introducing novel instructions in the CALL and RET translations. These novel instructions can be used to guarantee that if RET_TGT' is executed, it has been reached only from RET'.
 c. The optimizations disclosed herein ensure that the block that is the target of RET' is reached only from RET' by eliminating side entry distance to the translation even when the function is only partially included. The novel DRSB register helps to ensure that this locality is not broken.
 d. The teachings of the specification also improve the performance of translated CALL/RET sequences in cases where the RET_TGT paths are fully included in the translation by eliminating any branch penalties associated with the return. This covers scenarios in which a single CALL/RET, single CALL, multiple RET, and multiple CALL are to the same CALL_TGT.

Note that in certain existing processor, only "hot" code is translated and optimized. Hot code is code that has been observed to be frequently executed, and is therefore deemed worthy of the overhead of translation and optimization. The rest of the execution may be in the guest code space itself. Thus, in certain embodiments, the guest and the translated ISA may be the same. However, in the present specification, they are referred to as two distinct entities to illustrate the features of the present specification. Thus, it should be understood, that when speaking of the translated or optimized code, this may include untranslated or unoptimized code that is executed, jointly with the optimized code, in the guest code space. On the other hand, the guest code or guest ISA may refer generally to the original unoptimized code.

A system and method for call return optimization will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

Certain of the figures below detail example architectures and systems to implement embodiments of the above. In some embodiments, one or more hardware components and/or instructions described above are emulated as detailed below, or implemented as software modules.

In certain examples, instruction(s) may be embodied in a "generic vector-friendly instruction format," which is detailed below. In other embodiments, another instruction format is used. The description below of the write mask registers, various data transformations (swizzle, broadcast, etc.), addressing, etc. is generally applicable to the description of the embodiments of the instruction(s) above. Additionally, example systems, architectures, and pipelines are detailed below. Embodiments of the instruction(s) above may be executed on those systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are fewer fields included) and/or defined to have a given field interpreted differently. Thus, each instruction of an ISA is expressed using a given instruction format (and, if defined, in a given one of the instruction templates of that instruction format) and includes fields for specifying the operation and the operands. In one embodiment, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the advanced vector extensions (AVXs) (AVX1 and AVX2), and using the vector extensions (VEX) coding scheme has been released and/or published (e.g., see Intel® 64 and IA-32 Architectures Software Developer's Manual, September 2014; and see Intel® Advanced Vector Extensions Programming Reference, October 2014).

Example Instruction Formats

Embodiments of the instruction(s) described herein may be embodied in different formats. Additionally, example systems, architectures, and pipelines are detailed below. Embodiments of the instruction(s) may be executed on such systems, architectures, and pipelines, but are not limited to those detailed.

Generic Vector-Friendly Instruction Format

A vector-friendly instruction format is an instruction format that is suited for vector instructions (e.g., there are certain fields specific to vector operations). While embodiments are described in which both vector and scalar operations are supported through the vector-friendly instruction format, alternative embodiments use only vector operations through the vector-friendly instruction format.

FIGS. 1a-1b are block diagrams illustrating a generic vector-friendly instruction format and instruction templates thereof according to embodiments of the specification. FIG. 1a is a block diagram illustrating a generic vector-friendly instruction format and class A instruction templates thereof according to embodiments of the specification; while FIG. 1b is a block diagram illustrating the generic vector-friendly instruction format and class B instruction templates thereof according to embodiments of the specification. Specifically, a generic vector-friendly instruction format 100 for which are defined class A and class B instruction templates, both of which include no memory access 105 instruction templates and memory access 120 instruction templates. The term generic in the context of the vector-friendly instruction format refers to the instruction format not being tied to any specific instruction set.

Embodiments of the specification will be described in which the vector-friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operands and sizes (e.g., 256 byte vector operands) with more, less, or different data element widths (e.g., 128 bit (16 byte) data element widths).

The class A instruction templates in FIG. 1a include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, nontemporal 130 instruction template. The class B instruction templates in FIG. 1b include: 1) within the no memory access 105 instruction templates there is shown a no memory access, write mask control, partial round control type operation 112 instruction template and a no memory access, write mask control, VSIZE type operation 117 instruction template; and 2) within the memory access 120 instruction templates there is shown a memory access, write mask control 127 instruction template.

The generic vector-friendly instruction format 100 includes the following fields listed below in the order illustrated in FIGS. 1a-1b.

Format field 140—a specific value (an instruction format identifier value) in this field uniquely identifies the vector-friendly instruction format, and thus occurrences of instructions in the vector-friendly instruction format in instruction streams. As such, this field is optional in the sense that it is not needed for an instruction set that has only the generic vector-friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or fewer sources and destination registers (e.g., may support up to two sources where one of these sources also acts as the destination, may support up to three sources where one of these sources also acts as the destination, or may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, fewer, or different ways to perform memory address calculations.

Augmentation operation field 150—its content distinguishes which one of a variety of different operations to be performed in addition to the base operation. This field is context specific. In one embodiment of the specification, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}*\text{index}+\text{base}$).

Displacement Field 162A—its content is used as part of memory address generation (e.g., for address generation that uses $2^{scale}*\text{index}+\text{base}+\text{displacement}$).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operand's total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments, for all instructions; in other embodiments, for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-write masking, while class B instruction templates support both merging and zeroing-write masking. When merging, vector masks allow any set of elements in the destination to be protected from updates during the execution of any operation (specified by the base operation and the augmentation operation)—in one embodiment, preserving the old value of each element of the destination where the corresponding mask bit has a 0. In contrast, when zeroing vector masks allow any set of elements in the destination to be zeroed during the execution of any operation (specified by the base operation and the augmentation operation), in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the specification are described in which the write mask field's 170 content selects one of a number of write mask registers that contains the write mask to be used (and thus the write mask field's 170 content indirectly identifies that masking to be performed), alternative embodiments instead or additionally allow the mask write field's 170 content to directly specify the masking to be performed.

Immediate field 172—its content allows for the specification of an immediate. This field is optional in the sense that is it not present in an implementation of the generic vector-friendly format that does not support immediate and it is not present in instructions that do not use an immediate.

Class field 168—its content distinguishes between different classes of instructions. With reference to FIGS. 1a-1b, the contents of this field select between class A and class B instructions. In FIGS. 1a-1b, rounded corner squares are used to indicate a specific value is present in a field (e.g., class A 168A and class B 168B for the class field 168 respectively in FIGS. 1a-1b).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content provides static rounding. While in the described embodiments of the specification the round control field 154A includes a suppress all floating point exceptions (SAE) field 156 and a round operation control field 158, alternative embodiments may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., round-up, round-down, round-towards-zero and round-to-nearest). Thus, the round operation control field 158 allows for the changing of the rounding mode on a per instruction basis. In one embodiment of the specification where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1a, temporal 152B.1 and nontemporal 152B.2 are respectively specified for the memory access, temporal 125 instruction template and the memory access, nontemporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred as dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Nontemporal

Nontemporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale field 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., round-up, round-down, round-towards-zero and round-to-nearest). Thus, the round operation control field 159A allows for the changing of the rounding mode on a per instruction basis. In one embodiment of the specification where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted by the vector length field 159B. The memory access 120 instruction templates include the scale field 160, and optionally the displacement field 162A or the displacement scale field 162B.

With regard to the generic vector-friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector-friendly instruction format.

The combination of write mask field and data element width field create typed instructions in that they allow the mask to be applied based on different data element widths.

The various instruction templates found within class A and class B are beneficial in different situations. In some embodiments of the specification, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the specification). Also, a single processor may include multiple cores, all of which support the same class or in which different cores support different classes. For instance, in a processor with separate graphics and general purpose cores, one of the graphics cores intended primarily for graphics and/or scientific computing may support only class A, while one or more of the general purpose cores may be high performance general purpose cores with out-of-order execution and register renaming intended for general-purpose computing that supports only class B. Another processor that does not have a separate graphics core may include one more general purpose in-order or out-of-order cores that support both class A and class B. Of course, features from one class may also be implemented in the other class in different embodiments of the specification. Programs written in a high level language would be put (e.g., just in time compiled or statically compiled) into an variety of different executable forms, including: 1) a form having only instructions of the class or classes supported by the target processor for execution; or 2) a form having alternative routines written using different combinations of the instructions of all classes and having control flow code that selects the routines to execute based on the instructions supported by the processor which is currently executing the code.

Example Specific Vector-Friendly Instruction Format

FIG. 2 is a block diagram illustrating an example specific vector-friendly instruction format according to embodiments of the specification. FIG. 2 shows a specific vector-friendly instruction format 200 that is specific in the sense that it specifies the location, size, interpretation, and order of the fields, as well as values for some of those fields. The specific vector-friendly instruction format 200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIGS. 1a and 1b into which the fields from FIG. 2 map are illustrated.

It should be understood that, although embodiments of the specification are described with reference to the specific vector-friendly instruction format 200 in the context of the generic vector-friendly instruction format 100 for illustrative purposes, the present specification is not limited to the specific vector-friendly instruction format 200 except where claimed. For example, the generic vector-friendly instruction format 100 contemplates a variety of possible sizes for the various fields, while the specific vector-friendly instruction format 200 is shown as having fields of specific sizes. By way of particular example, while the data element width field 164 is illustrated as a one bit field in the specific vector-friendly instruction format 200, the present specification is not so limited (that is, the generic vector-friendly instruction format 100 contemplates other sizes of the data element width field 164).

Figure 2A:
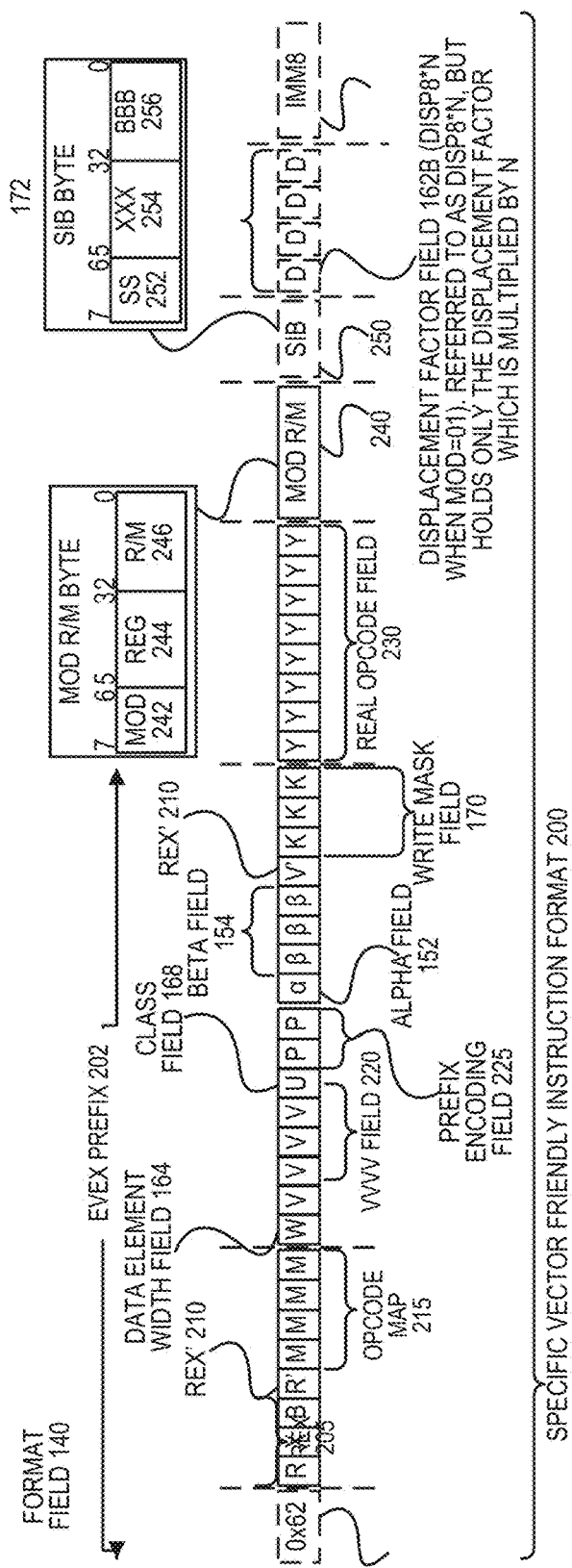
FIGS. 2a-2d are block diagrams illustrating an example specific vector-friendly instruction format according to one or more examples of the present specification.

The generic vector-friendly instruction format 100 includes the following fields listed below in the order illustrated in FIG. 2a.

EVEX Prefix (Bytes 0-3) 202—is encoded in a four-byte form.

Format Field 140 (EVEX Byte 0, bits [7:0])—the first byte (EVEX Byte 0) is the format field 140 and it contains 0x62 (the unique value used for distinguishing the vector-friendly instruction format in one embodiment).

The second through fourth bytes (EVEX Bytes 1-3) include a number of bit fields providing specific capability.

REX field 205 (EVEX Byte 1, bits [7-5])—consists of an EVEX.R bit field (EVEX Byte 1, bit [7]—R), EVEX.X bit field (EVEX byte 1, bit [6]—X), and 157BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 110—this is the first part of the REX' field 110 and is the EVEX.R' bit field (EVEX Byte 1, bit [4]—R') that is used to encode either the upper 16 or lower 16 of the extended 32 register set. In one embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; other embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 215 (EVEX byte 1, bits [3:0]—mmmm)—its content encodes an implied leading opcode byte (0F, 0F 38, or 0F 3).

Data element width field 164 (EVEX byte 2, bit [7]—W)—is represented by the notation EVEX.W. EVEX.W is used to define the granularity (size) of the datatype (either 32-bit data elements or 64-bit data elements).

EVEX.vvvv 220 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 220 encodes the 4 low-order bits of the first source register specifier stored in inverted (1s complement) form. Depending on the instruction, an extra different EVEX bit field is used to extend the specifier size to 32 registers.

EVEX.U 168 Class field (EVEX byte 2, bit [2]—U)—if EVEX.U=0, it indicates class A or EVEX.U0; if EVEX.U=1, it indicates class B or EVEX.U1.

Prefix encoding field 225 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use an SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 152 (EVEX byte 3, bit [7]—EH; also known as EVEX.eh, EVEX.rs, EVEX.rl, EVEX.write mask control, and EVEX.n; also illustrated with α)—as previously described, this field is context specific.

Beta field 154 (EVEX byte 3, bits [6:4]—SSS, also known as $EVEX.s_{2-0}$, $EVEX.r_{2-0}$, EVEX.rr1, EVEX.LL0, EVEX.LLB; also illustrated with βββ)—as previously described, this field is context specific.

REX' field 110—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 170 (EVEX byte 3, bits [2:0]—kkk)—its content specifies the index of a register in the write mask registers as previously described. In one embodiment, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 230 (Byte 4) is also known as the opcode byte. Part of the opcode is specified in this field.

MOD R/M Field 240 (Byte 5) includes MOD field 242, Reg field 244, and R/M field 246. As previously described, the MOD field's 242 content distinguishes between memory access and non-memory access operations. The role of Reg field 244 can be summarized to two situations: encoding either the destination register operand or a source register operand, or be treated as an opcode extension and not used to encode any instruction operand. The role of RIM field 246 may include the following: encoding the instruction operand that references a memory address, or encoding either the destination register operand or a source register operand.

Scale, Index, Base (SIB) Byte (Byte 6)—as previously described, the scale field's 150 content is used for memory address generation. SIB.xxx 254 and SIB.bbb 256—the contents of these fields have been previously referred to with regard to the register indexes Xxxx and Bbbb.

Displacement field 162A (Bytes 7-10)—when MOD field 242 contains 10, bytes 7-10 are the displacement field 162A, and it works the same as the legacy 32-bit displacement (disp32) and works at byte granularity.

Displacement factor field 162B (Byte 7)—when MOD field 242 contains 01, byte 7 is the displacement factor field 162B. The location of this field is the same as that of the legacy x86 instruction set 8-bit displacement (disp8), which works at byte granularity. Since disp8 is sign extended, it can only address between 128 and 127-byte offsets; in terms of 64 byte cache lines, disp8 uses 8 bits that can be set to only four really useful values –128, –64, 0, and 64; since a greater range is often needed, disp32 is used; however, disp32 requires 4 bytes. In contrast to disp8 and disp32, the displacement factor field 162B is a reinterpretation of disp8; when using displacement factor field 162B, the actual displacement is determined by the content of the displacement factor field multiplied by the size of the memory operand access (N). This type of displacement is referred to as disp8*N. This reduces the average instruction length (a single byte used for the displacement but with a much greater range). Such compressed displacement is based on the assumption that the effective displacement is a multiple of the granularity of the memory access, and hence, the redundant low-order bits of the address offset do not need to be encoded. In other words, the displacement factor field 162B substitutes the legacy x86 instruction set 8-bit displacement. Thus, the displacement factor field 162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 172 operates as previously described.

Full Opcode Field

Figure 2B:
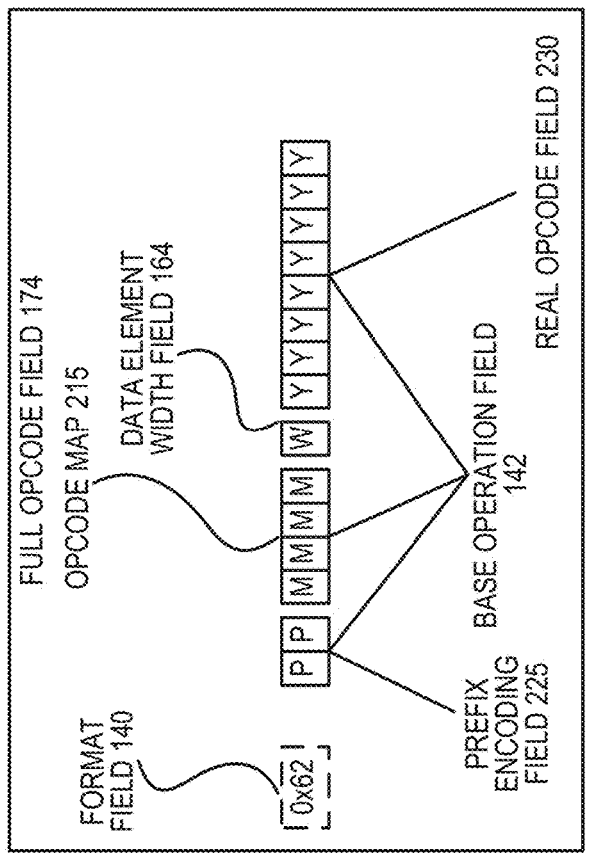

FIG. 2b is a block diagram illustrating the fields of the specific vector-friendly instruction format 200 that make up the full opcode field 174 according to one embodiment. Specifically, the full opcode field 174 includes the format field 140, the base operation field 142, and the data element width (W) field 164. The base operation field 142 includes the prefix encoding field 225, the opcode map field 215, and the real opcode field 230.

Register Index Field

Figure 2C:
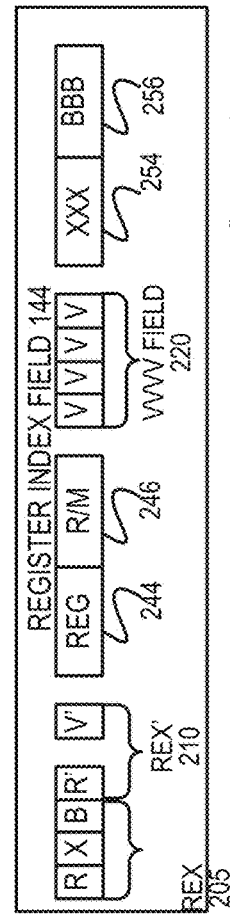

FIG. 2c is a block diagram illustrating the fields of the specific vector-friendly instruction format 200 that make up the register index field 144 according to one embodiment. Specifically, the register index field 144 includes the REX field 205, the REX' field 210, the MODR/M.reg field 244, the MODR/M.r/m field 246, the VVVV field 220, xxx field 254, and the bbb field 256.

Augmentation Operation Field

Figure 2D:
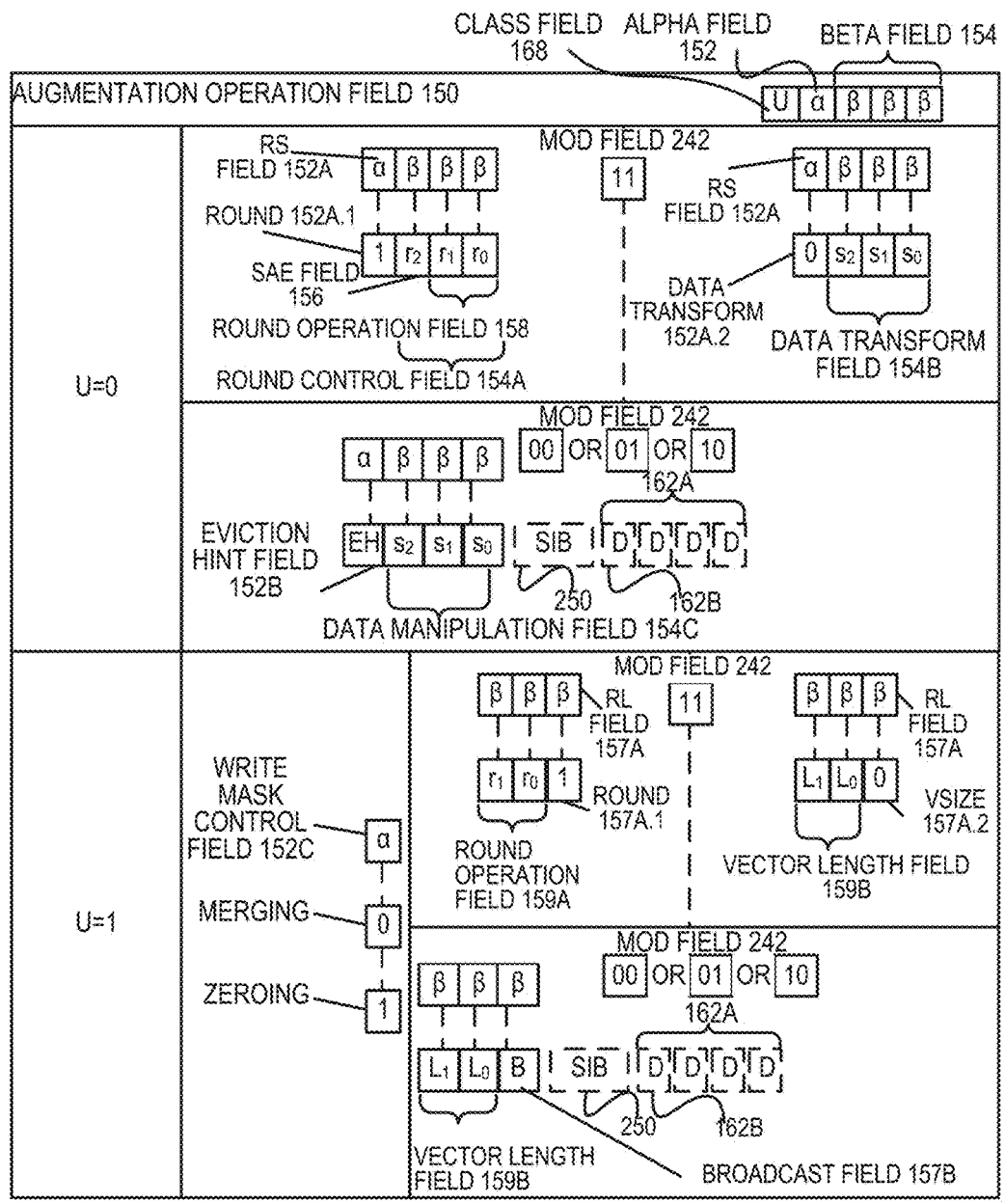

FIG. 2d is a block diagram illustrating the fields of the specific vector-friendly instruction format 200 that make up the augmentation operation field 150 according to one embodiment. When the class (U) field 168 contains 0, it signifies EVEX.U0 (class A 168A); when it contains 1, it signifies EVEX.U1 (class B 168B). When U=0 and the MOD field 242 contains 11 (signifying a no memory access operation), the alpha field 152 (EVEX byte 3, bit [7]—EH) is interpreted as the rs field 152A. When the rs field 152A contains a 1 (round 152A.1), the beta field 154 (EVEX byte 3, bits [6:4]—SSS) is interpreted as the round control field 154A. The round control field 154A includes a one bit SAE field 156 and a two bit round operation field 158. When the rs field 152A contains a 0 (data transform 152A.2), the beta field 154 (EVEX byte 3, bits [6:4]—SSS) is interpreted as a three bit data transform field 154B. When U=0 and the MOD field 242 contains 00, 01, or 10 (signifying a memory access operation), the alpha field 152 (EVEX byte 3, bit [7]—EH) is interpreted as the eviction hint (EH) field 152B and the beta field 154 (EVEX byte 3, bits [6:4]—SSS) is interpreted as a three bit data manipulation field 154C.

When U=1, the alpha field 152 (EVEX byte 3, bit [7]—EH) is interpreted as the write mask control (Z) field 152C. When U=1 and the MOD field 242 contains 11 (signifying a no memory access operation), part of the beta field 154 (EVEX byte 3, bit [4]—$S_0$) is interpreted as the RL field 157A; when it contains a 1 (round 157A.1) the rest of the beta field 154 (EVEX byte 3, bit [6-5]—$S_{2-1}$) is interpreted as the round operation field 159A, while when the RL field 157A contains a 0 (VSIZE 157.A2) the rest of the beta field 154 (EVEX byte 3, bit [6-5]—$S_{2-1}$) is interpreted as the vector length field 159B (EVEX byte 3, bit [6-5]—$L_{1-0}$). When U=1 and the MOD field 242 contains 00, 01, or 10 (signifying a memory access operation), the beta field 154 (EVEX byte 3, bits [6:4]—SSS) is interpreted as the vector length field 159B (EVEX byte 3, bit [6-5]—$L_{1-0}$) and the broadcast field 157B (EVEX byte 3, bit [4]—B).

Example Register Architecture

Figure 3:
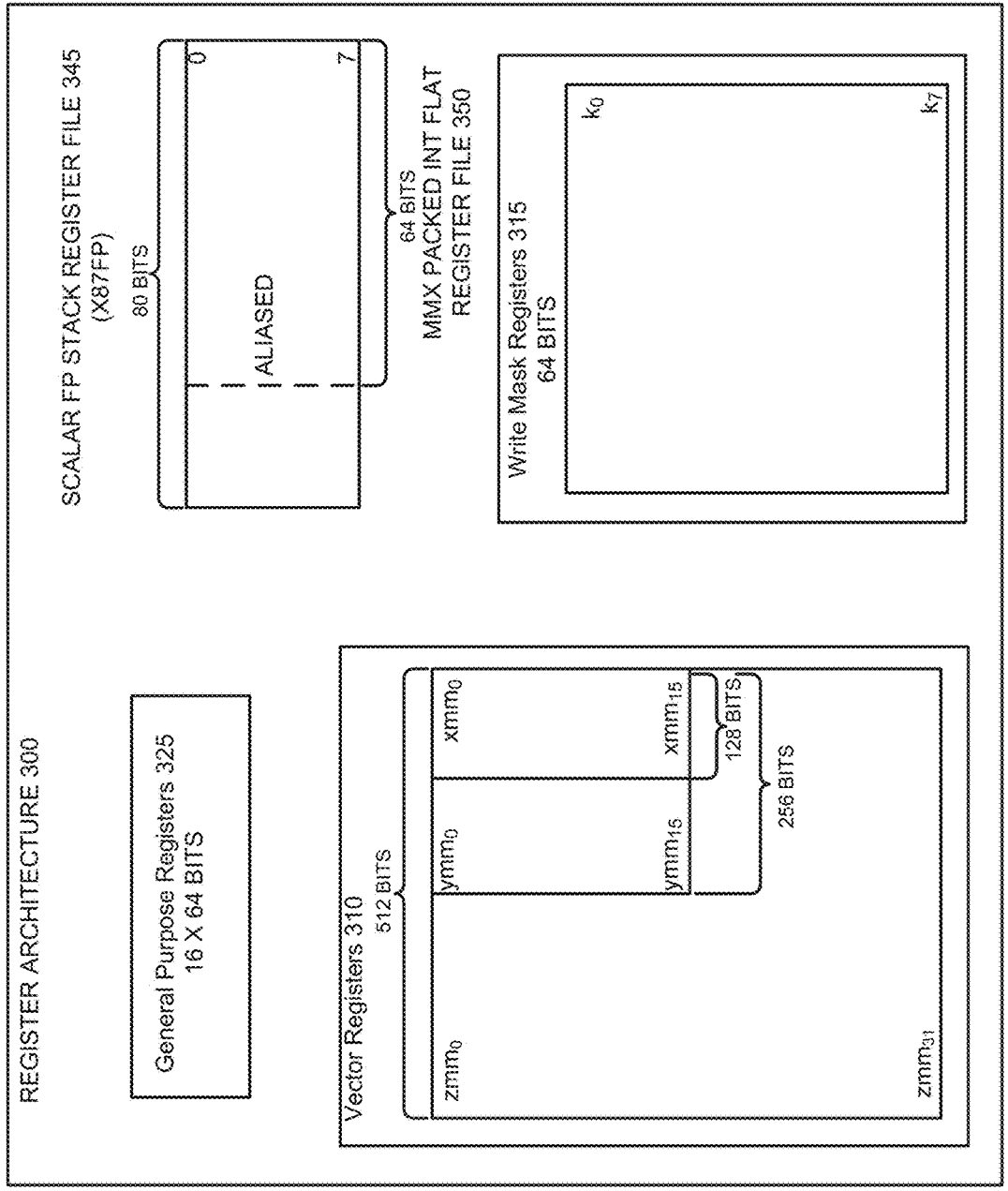
FIG. 3 is a block diagram of a register architecture according to one or more examples of the present specification.

FIG. 3 is a block diagram of a register architecture 300 according to one embodiment. In the embodiment illustrated, there are 32 vector registers 310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector-friendly instruction format 200 operates on these overlaid register files as illustrated in the below tables.

| Adjustable Vector Length | Class | Operations | Registers |
|---|---|---|---|
| Instruction Templates that do not include the vector length field 159B | A (FIG. 1A; U = 0) | 110, 115, 125, 130 | zmm registers (the vector length is 64 byte) |
| | B (FIG. 1B; U = 1) | 112 | zmm registers (the vector length is 64 byte) |
| Instruction templates that do include the vector length field 159B | B (FIG. 1B; U = 1) | 117, 127 | zmm, ymm, or xmm registers (the vector length is 64 byte, 32 byte, or 16 byte) depending on the vector length field 159B |

In other words, the vector length field 159B selects between a maximum length and one or more other shorter lengths, where each such shorter length is half the length of the preceding length; and instruction templates without the vector length field 159B operate on the maximum vector length. Further, in one embodiment, the class B instruction templates of the specific vector-friendly instruction format 200 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 315—in the embodiment illustrated, there are 8 write mask registers (k0 through k7), each 64 bits in size. In an alternate embodiment, the write mask registers 315 are 16 bits in size. As previously described, in one embodiment, the vector mask register k0 cannot be used as a write mask; when the encoding that would normally indicate k0 is used for a write mask, it selects a hardwired write mask of 0xFFFF, effectively disabling write masking for that instruction.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Other embodiments may use wider or narrower registers. Additionally, other embodiments may use more, less, or different register files and registers.

Example Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific throughput. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Example core architectures are described next, followed by descriptions of example processors and computer architectures.

Example Core Architectures

In-Order and Out-of-Order Core Block Diagram

Figure 4A:
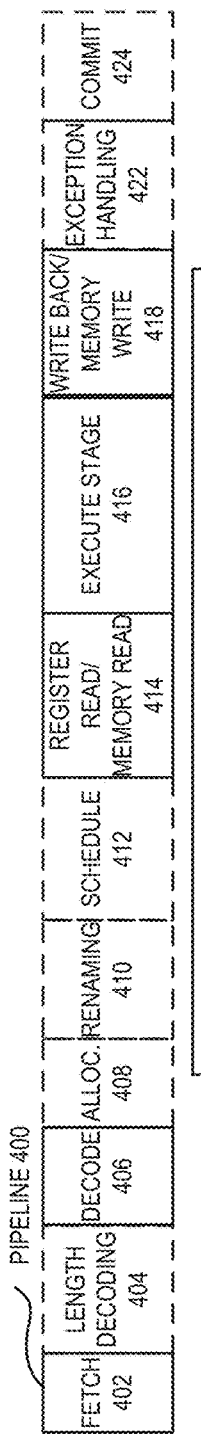
FIG. 4a is a block diagram illustrating both an example in-order pipeline and an example register renaming an out-of-order issue/execution pipeline according to one or more examples of the present specification.
Figure 4B:
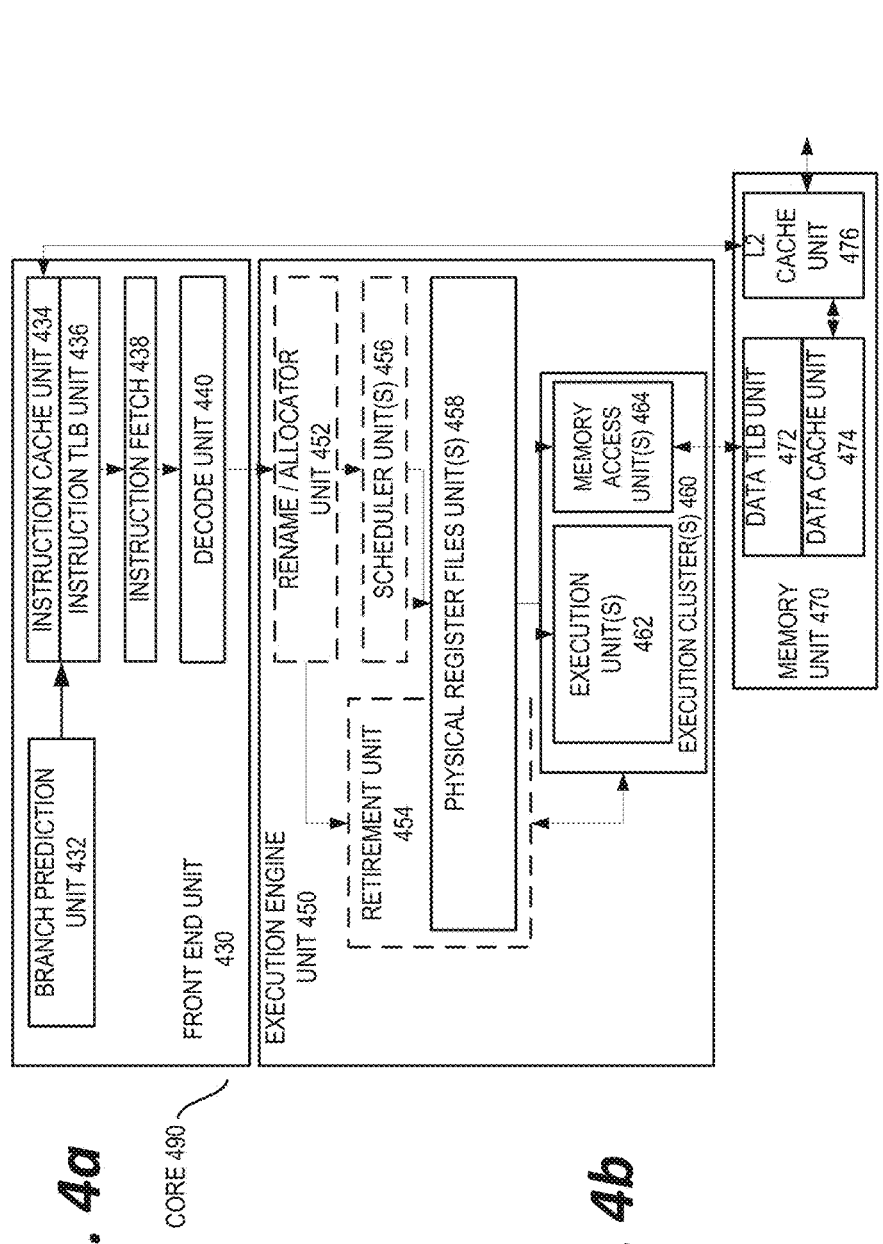
FIG. 4b is a block diagram illustrating both an example of an in-order architecture core and an example register renaming an out-of-order issue/execution architecture core to be included in a processor according to one or more examples of the present specification.

FIG. 4a is a block diagram illustrating both an example in-order pipeline and an example register renaming, out-of-order issue/execution pipeline. FIG. 4B is a block diagram illustrating both an embodiment of an in-order architecture core and an example register renaming, out-of-order issue/execution architecture core to be included in a processor. The solid lined boxes in FIGS. 4a-4b illustrate the in-order pipeline and in-order core, while the optional addition of the dashed, lined boxes illustrates the register renaming, out-of-order issue/execution pipeline and core. Given that the in-order aspect is a subset of the out-of-order aspect, the out-of-order aspect will be described.

In FIG. 4a, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4b shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservation stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 performs the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instruction sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Example In-Order Core Architecture

FIGS. 5a-5b illustrate a block diagram of a more specific example in-order core architecture, which core would be one of several logic blocks (including other cores of the same type and/or different types) in a chip. The logic blocks communicate through a high-bandwidth interconnect network (e.g., a ring network) with some fixed function logic, memory IO interfaces, and other necessary IO logic, depending on the application.

FIG. 5a is a block diagram of a single processor core, along with its connection to the on-die interconnect network 502 and with its local subset of the Level 2 (L2) cache 504, according to one or more embodiments. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, other embodiments may use a different approach (e.g., use a single register set or include a communication path that allows data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 5b is an expanded view of part of the processor core in FIG. 5a according to embodiments of the specification. FIG. 5b includes an L1 data cache 506A, part of the L1 cache 504, as well as more detail regarding the vector unit 510 and the vector registers 514. Specifically, the vector unit 510 is a 16-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input. Write mask registers 526 allow predicating resulting vector writes.

Figure 6:
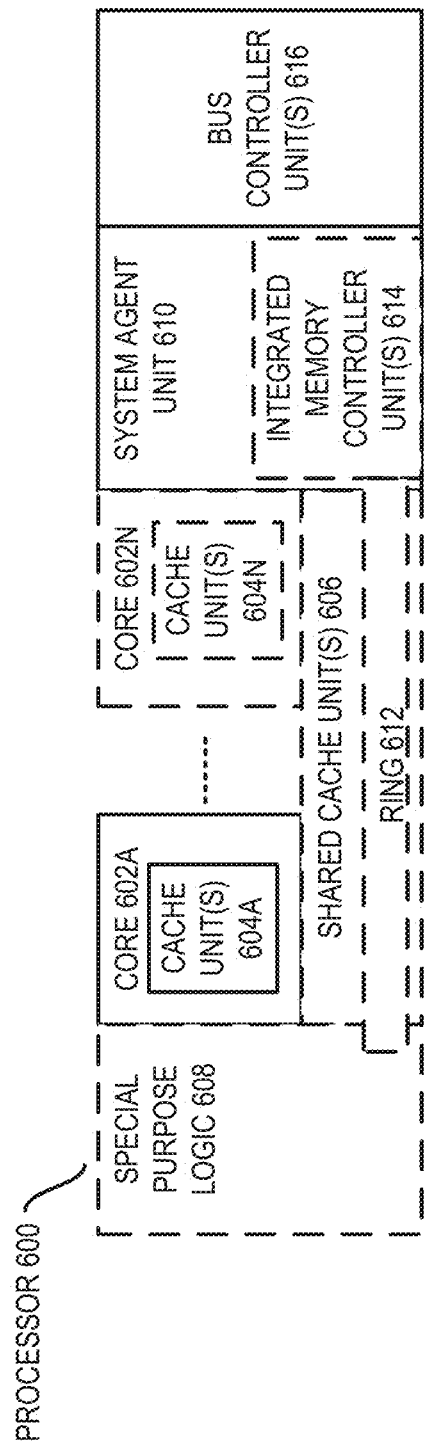
FIG. 6 is a block diagram of a processor that may have more than one core, may have an integrated memory controller, and may have integrated graphics according to one or more examples of the present specification.

FIG. 6 is a block diagram of a processor 600 that may have more than one core, may have an integrated memory controller, and may have integrated graphics according to embodiments of the specification. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific throughput; and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602A-N.

In some embodiments, one or more of the cores 602A-N are capable of multi-threading. The system agent 610 includes those components coordinating and operating cores 602A-N. The system agent unit 610 may include, for example, a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of executing the same instruction set, while others may be capable of executing only a subset of that instruction set or a different instruction set.

Example Computer Architectures

FIGS. 7-10 are block diagrams of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
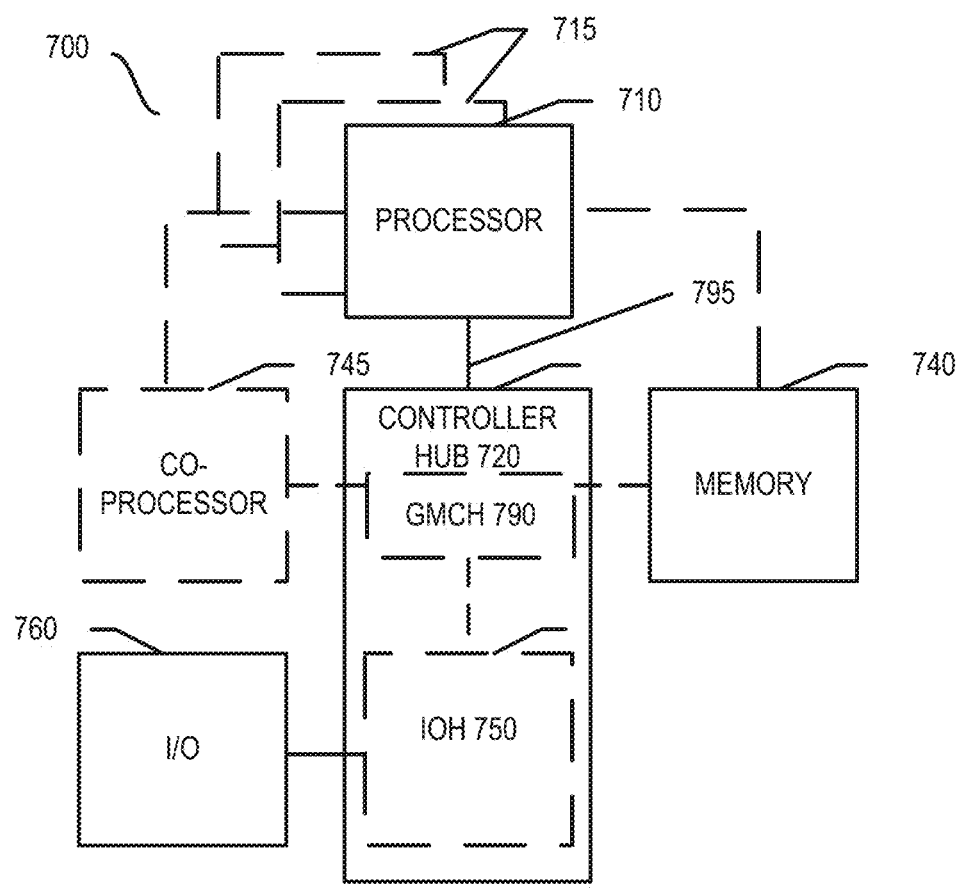
FIGS. 7-10 are block diagrams of computer architectures according to one or more examples of the present specification.

Referring now to FIG. 7, shown is a block diagram of a system 700 in accordance with one embodiment. The system 700 may include one or more processors 710, 715, which are coupled to a controller hub 720. In one embodiment the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 couples input/output (IO) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multidrop bus, such as a frontside bus (FSB), point-to-point interface such as Ultra Path Interconnect (UPI), or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 715 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accepts and executes the received coprocessor instructions.

Figure 8:
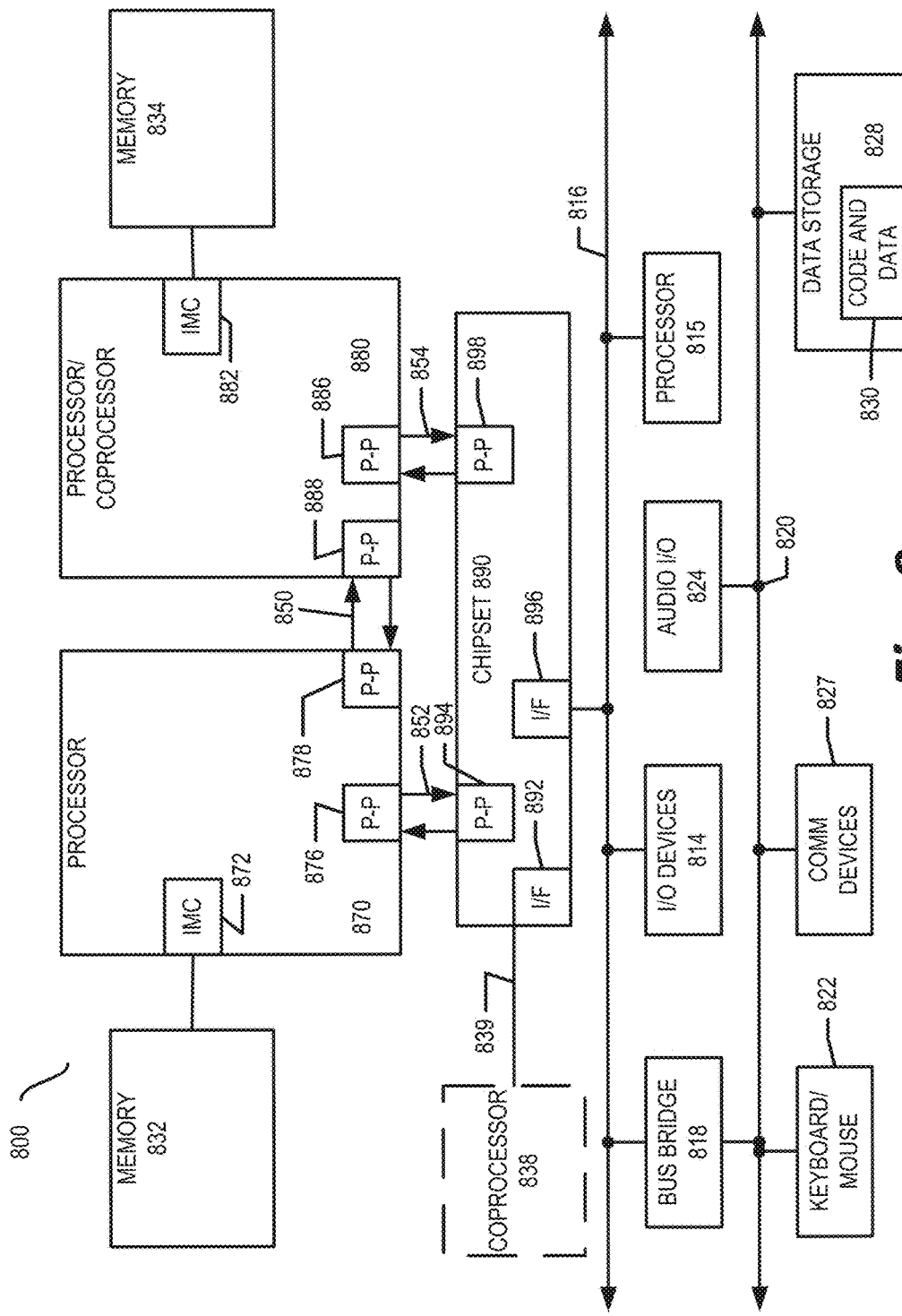

Referring now to FIG. 8, shown is a block diagram of a first more specific example system 800. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 839. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a peripheral component interconnect (PCI) bus, or a bus such as a PCI Express bus or another third generation IO interconnect bus, by way of nonlimiting example.

As shown in FIG. 8, various IO devices 814 may be coupled to first bus 816, along with a bus bridge 818 which couples first bus 816 to a second bus 820. In one embodiment, one or more additional processor(s) 815, such as coprocessors, high-throughput MIC processors, GPGPUs, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions or code and data 830, in one embodiment. Further, an audio IO 824 may be coupled to the second bus 820. Note that other architectures are possible. For example, instead of the point-to-point architecture of FIG. 8, a system may implement a multidrop bus or other such architecture.

Figure 9:
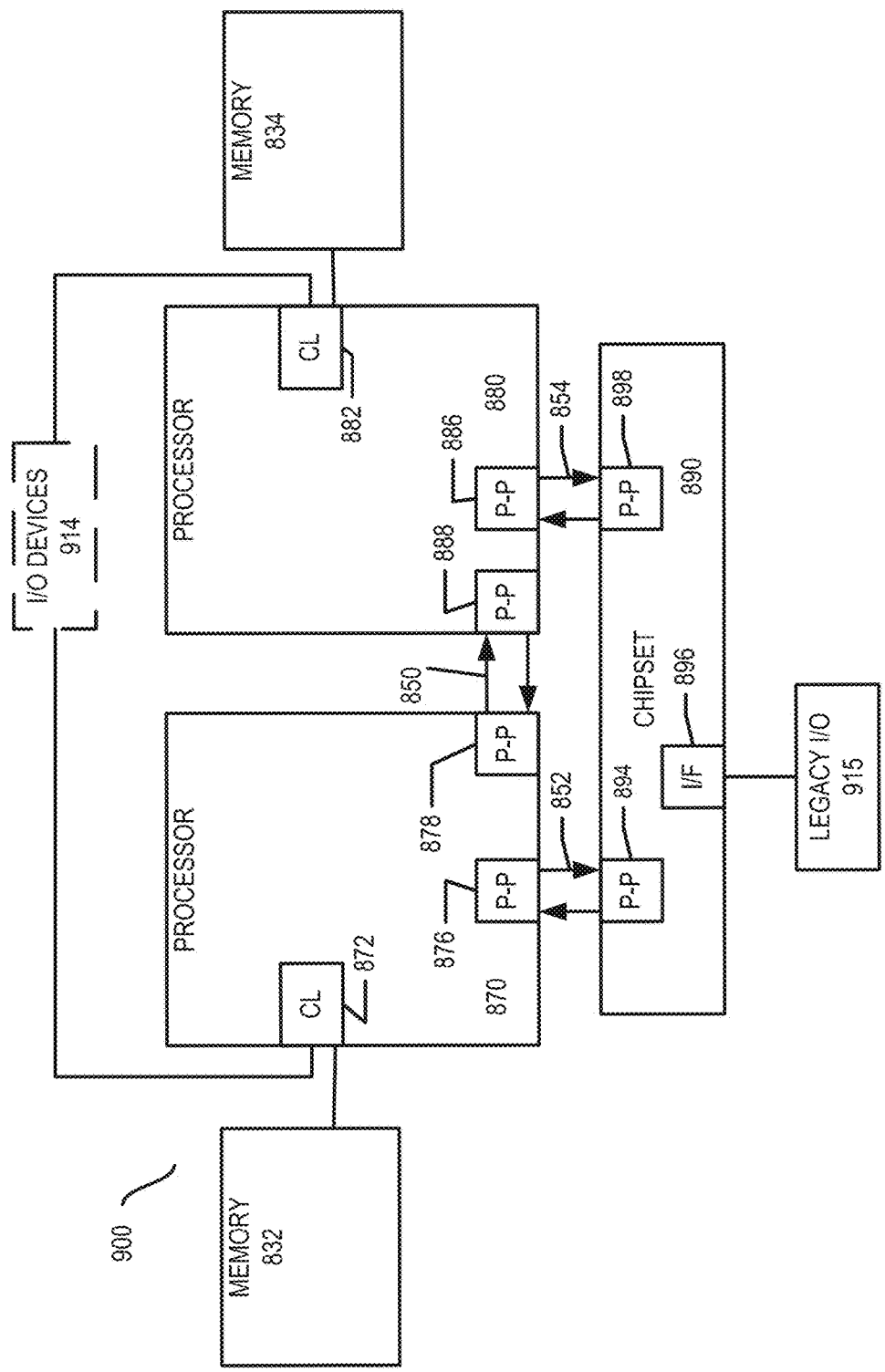

Referring now to FIG. 9, shown is a block diagram of a second more specific example system 900. FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and IO control logic ("CL") 872 and 882, respectively. Thus, the CL 872, 882 include integrated memory controller units and include IO control logic. FIG. 9 illustrates that not only are the memories 832, 834 coupled to the CL 872, 882, but also that IO devices 914 are also coupled to the control logic 872, 882. Legacy IO devices 915 are coupled to the chipset 890.

Figure 10:
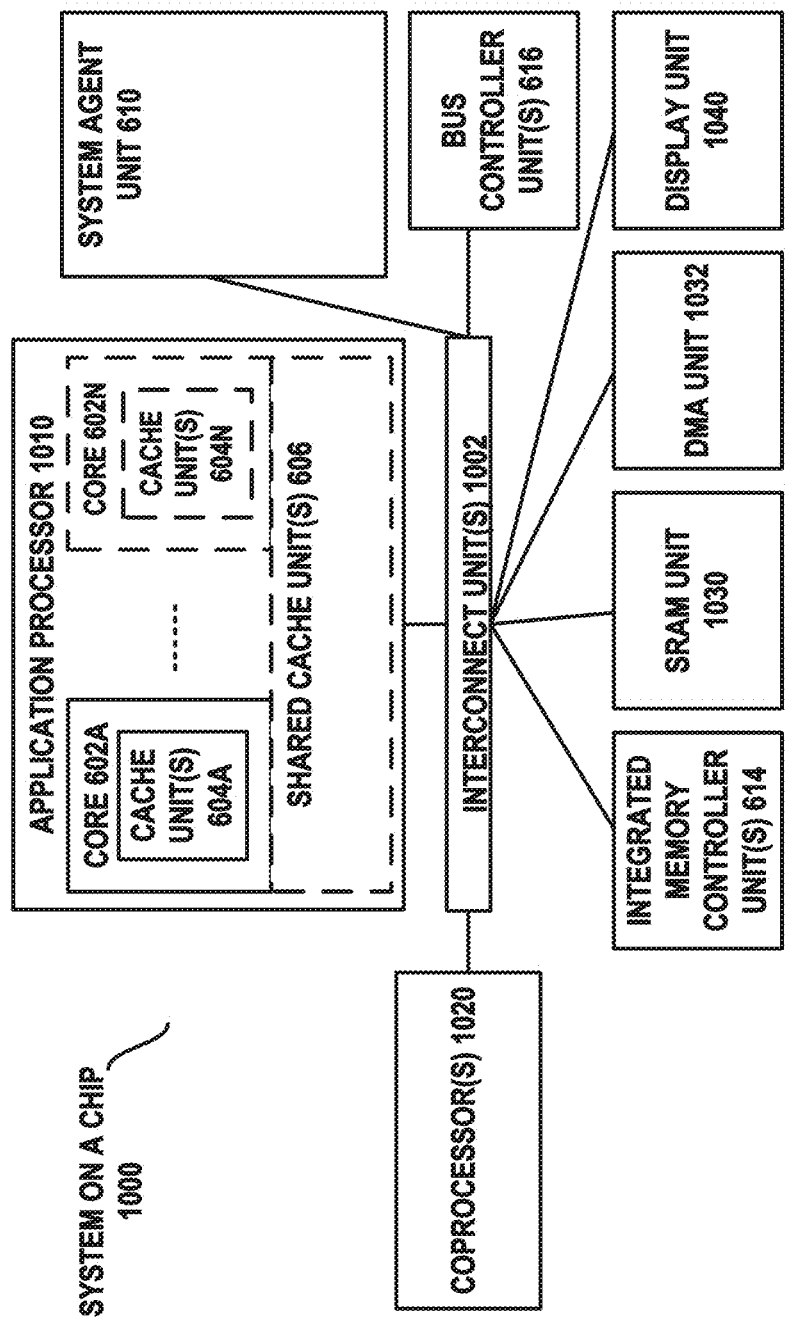

Referring now to FIG. 10, shown is a block diagram of a SoC 1000 in accordance with an embodiment. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 202A-N and shared cache unit(s) 606; a system agent unit 610; a bus controller unit(s) 616; an integrated memory controller unit(s) 614; a set of one or more coprocessors 1020 which may include integrated graphics logic, an image processor, an audio processor, and a video processor; a static random access memory (SRAM) unit 1030; a direct memory access (DMA) unit 1032; and a display unit 1040 for coupling to one or more external displays. In one embodiment, the coprocessor(s) 1020 includes a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Some embodiments may be implemented as computer programs or program code executing on programmable systems comprising at least one processor, a storage system (including volatile and nonvolatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application-specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, nontransitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, some embodiments also include nontransitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation or dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
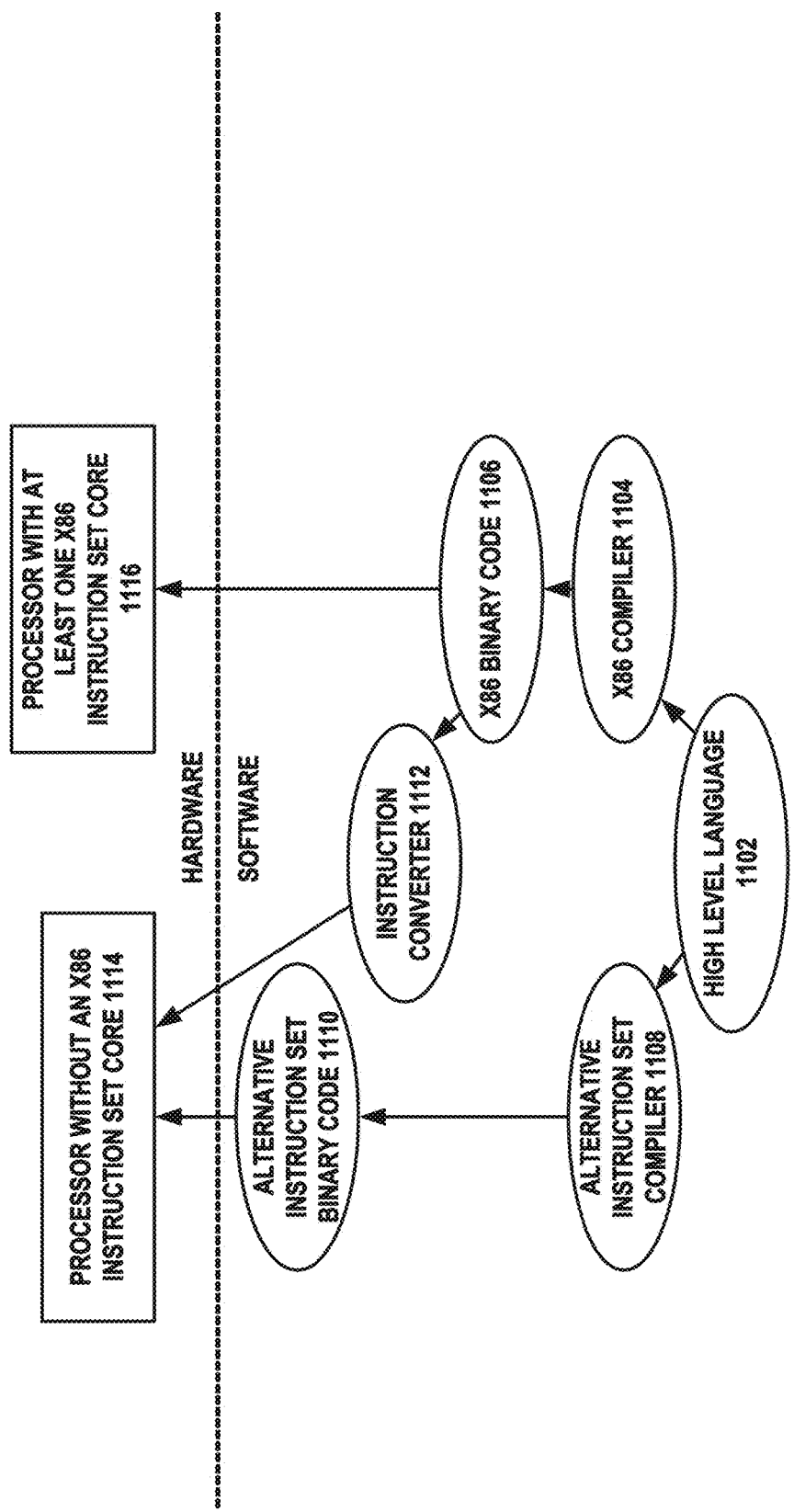
FIG. 11 is a block diagram contrasting the use of a software instruction converter to convert binary instructions in a source instruction set to binary instructions in a target instruction set according to one or more examples of the present specification.

FIG. 11 is a block diagram contrasting the use of a software instruction converter to convert binary instructions in a source instruction set to binary instructions in a target instruction set. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an x86 compiler 1104 to generate x86 binary code 1106 that may be natively executed by a processor with at least one x86 instruction set core 1116. The processor with at least one x86 instruction set core 1116 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1104 represents a compiler that is operable to generate x86 binary code 1106 (e.g., object code) that can, with or without additional linkage processing, be executed on the processor with at least one x86 instruction set core 1116. Similarly, FIG. 11 shows the program in the high level language 1102 may be compiled using an alternative instruction set compiler 1108 to generate alternative instruction set binary code 1110 that may be natively executed by a processor without at least one x86 instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the x86 binary code 1106 into code that may be natively executed by the processor without an x86 instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have an x86 instruction set processor or core to execute the x86 binary code 1106.

Figure 12:
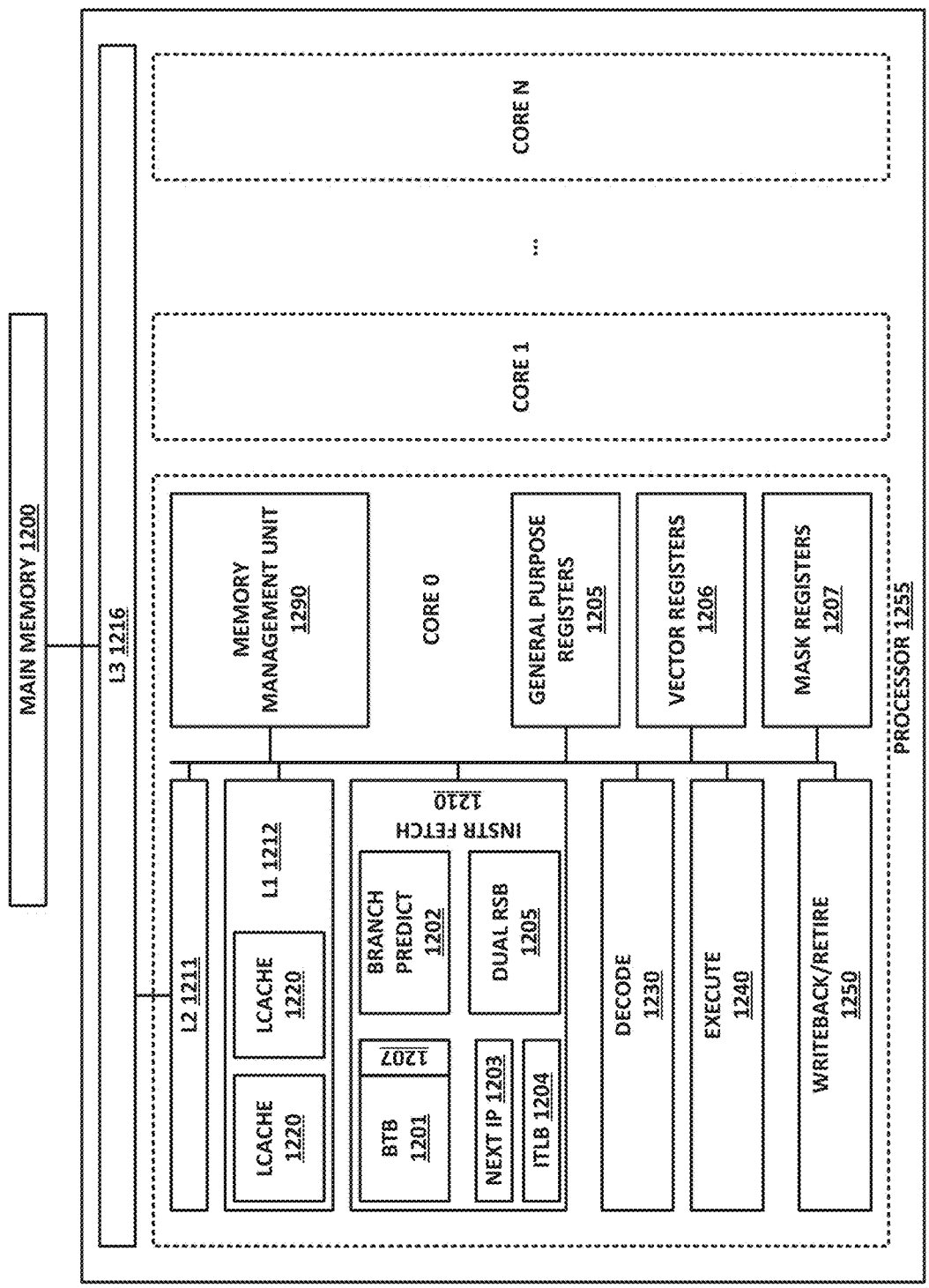
FIG. 12 illustrates an example processor on which embodiments of the specification may be implemented.

One embodiment of the present specification augments the existing RSB mechanism with the support required in order to track both the guest ISA and internal ISA return addresses. FIG. 12 illustrates an example processor 1255 on which embodiments of the specification may be implemented which includes a dual RSB 1205 which tracks return addresses for the guest ISA and corresponding return addresses for the host ISA, as described in detail below.

The example includes a plurality of cores 0-N, each including a memory management unit 1290 for performing memory operations (e.g., such as load/store operations), a set of general purpose registers (GPRs) 1205, a set of vector registers 1206, and a set of mask registers 1207. In one embodiment, multiple vector data elements are packed into each vector register 1206 which may have a 512 bit width for storing two 256 bit values, four 128 bit values, eight 64 bit values, sixteen 32 bit values, etc. However, the underlying principles of the specification are not limited to any particular size/type of vector data. In one embodiment, the mask registers 1207 include eight 64-bit operand mask registers used for performing bit masking operations on the values stored in the vector registers 1206 (e.g., implemented as mask registers k0-k7 described above). However, the underlying principles of the specification are not limited to any particular mask register size/type.

The details of a single processor core ("Core 0") are illustrated in FIG. 12 for simplicity. It will be understood, however, that each core of the processor 1255 may have the same set of logic as Core 0. For example, each core may include a dedicated Level 1 (L1) cache 1212 and Level 2 (L2) cache 1211 for caching instructions and data according to a specified cache management policy. The L1 cache 1212 includes a separate instruction cache 1220 for storing instructions and a separate data cache 1221 for storing data. The instructions and data stored within the various processor caches are managed at the granularity of cache lines which may be a fixed size (e.g., 64, 128, 512 Bytes in length). Each core of this example embodiment has an instruction fetch unit 1210 for fetching instructions from main memory 1200 and/or a shared Level 3 (L3) cache 1216; a decode unit 1220 for decoding the instructions (e.g., decoding program instructions into micro-operations or "uops"); an execution unit 1240 for executing the instructions; and a writeback unit 1250 for retiring the instructions and writing back the results.

The instruction fetch unit 1210 includes various well-known components including a next instruction pointer 1203 for storing the address of the next instruction to be fetched from memory 1200 (or one of the caches); an instruction translation look-aside buffer (ITLB) 1204 for storing a map of recently used virtual-to-physical instruction addresses to improve the speed of address translation; a branch prediction unit 1202 for speculatively predicting instruction branch addresses; and branch target buffers (BTBs) 1201 for storing branch addresses and target addresses. Once fetched, instructions are then streamed to the remaining stages of the instruction pipeline including the decode unit 1230, the execution unit 1240, and the writeback unit 1250. The structure and function of each of these units is well understood by those of ordinary skill in the art and will not be described here in detail to avoid obscuring the pertinent aspects of the different embodiments of the present specification.

Figure 13A:
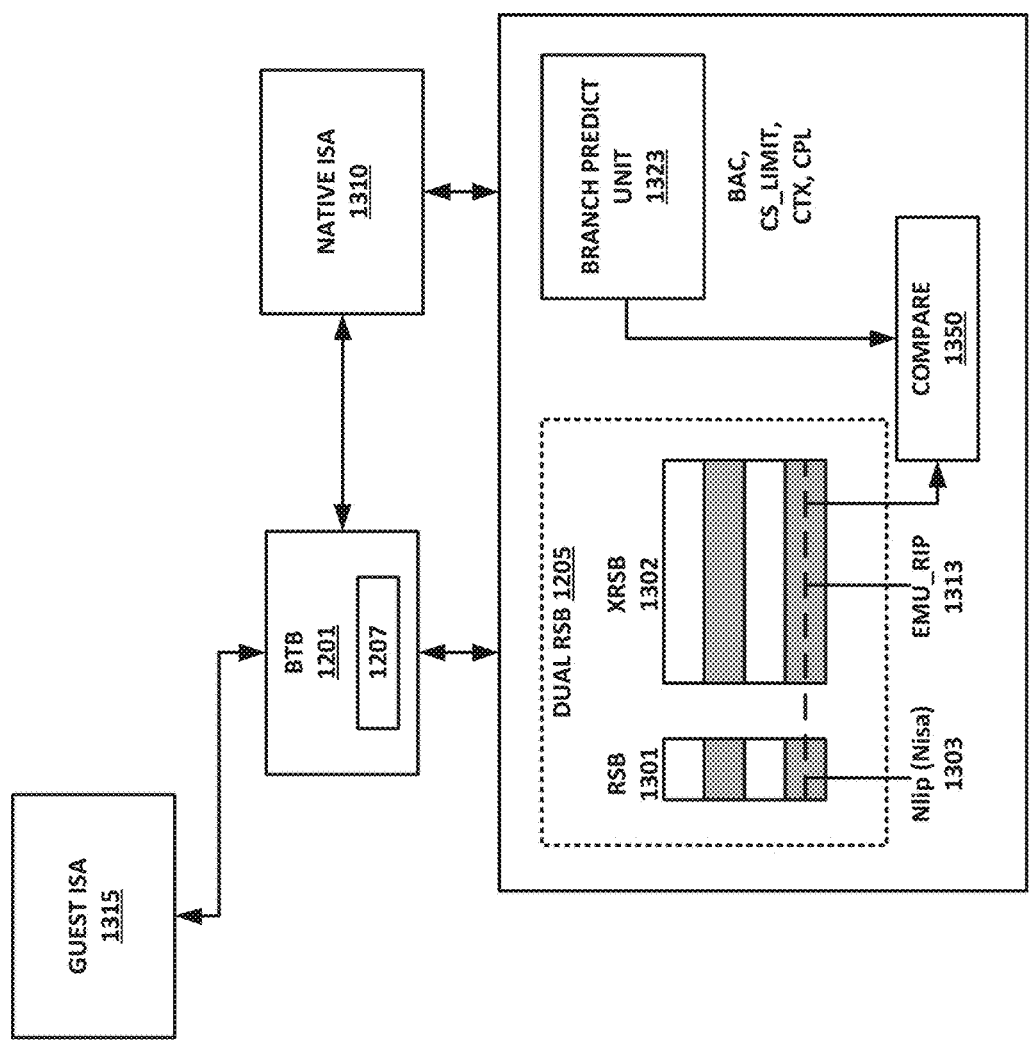
FIGS. 13a-13b illustrate an example dual return stack buffer (DRSB) according to one or more examples of the present specification.

FIG. 13A illustrates an example binary translation architecture on which the embodiments of the specification may be implemented. As mentioned above, a binary translator 1201 translates between a guest ISA 1315 and an internal ISA 1310 executed directly by the underlying processor hardware 1255. FIG. 13 also illustrates additional details of the dual RSB 1205 for maintaining return addresses for both the guest ISA and the internal ISA. In particular, the illustrated dual RSB 1205 includes an RSB component 1301 for storing return addresses 1303 for internal ISA program code and an extended RSB (XRSB) component 1302 for storing emulated return addresses 1303 for guest program code. In one embodiment, when binary translation is not utilized (e.g., when in x86 mode) only the base RSB 1301 is used. For the remainder of this detailed description, it will be assumed that binary translation and, thus, the extended RSB is being used.

In an embodiment, binary translator 1201 may include a region formation engine 1207. Region formation engine 1207 may be responsible for identifying regions for translation as described throughout this specification, such as in connection with FIGS. 15 and 17 by way of nonlimiting example. Region formation engine 1207 may include circuitry, hardware, firmware, software, or other logic elements that enable the processor of the present specification to perform the region formation that is part of the binary translation process described herein.

In operation, the XRSB 1302 is used to hold an x86 return address, and the RSB 1301 holds either an x86 or a translated return address, depending on a current mode of operation. As discussed below, this dual RSB implementation dramatically simplifies the sequence of operations required to process return addresses in a binary translation system. In one embodiment, a new return instruction is used to access the XRSB 1302 to determine the return address following execution of the called/translated instruction sequence. In addition, in one embodiment, logic is provided to ensure that the return address matches the expected value for the return address. In particular, as described in greater detail below, comparison logic 1350 compares the return address and associated information stored in the XRSB 1302 with a predicted return address read from the branch processing unit 1303. If the return address value in the XRSB matches the expected value, then it is used, resulting in a significant performance improvement. In the rare event that it does not match, then in one embodiment, an interrupt or trap is generated and handed off to the binary translator 1201 which takes control and recovers as described below.

In one embodiment, in addition to the XRSB 1302 which stores return addresses of emulated code, the dual RSB 1205 includes a mode bit in the RSB 1301 and additional logic described herein to interface with the emulated instruction pointer address (EMU_RIP) 1303. In one embodiment, the XRSB 1302 has one read/write port and 16 entries, although the underlying principles of the specification are not limited to this particular configuration.

Figure 13B:
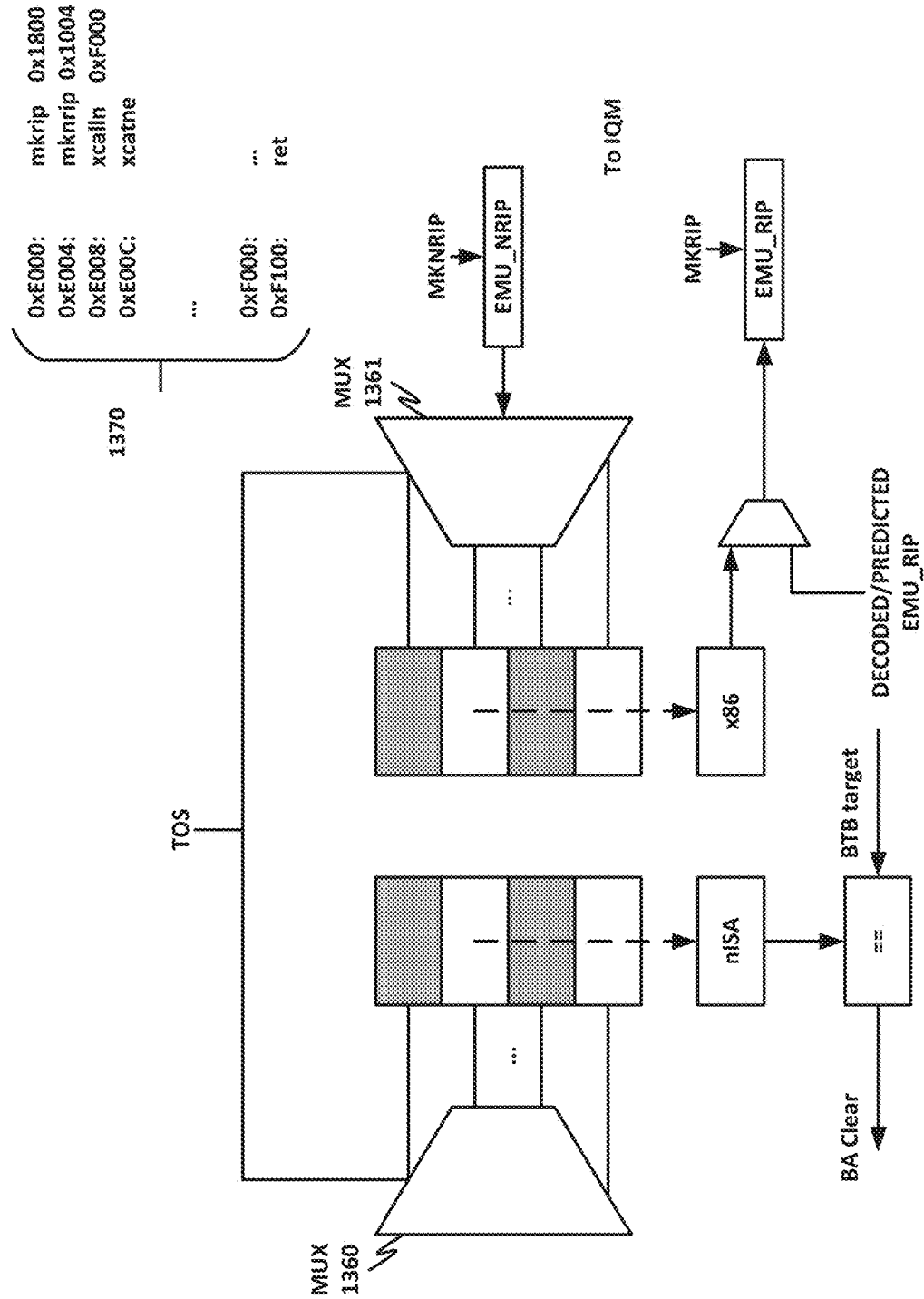

FIG. 13B illustrates additional detail in accordance with one embodiment of the specification. In particular, this embodiment illustrates a 1:16 port mux 1360 coupled to the RSB 1301 and used to store next linear instruction pointer (NLIP) values in response to a top of stack (TOS) signal (indicating the current top of the instruction stack) and another 1:16 port mux 1361 coupled to the XRSB 1302 and used to write emulated next return instruction pointer (EMU_NRIP) values in response to a MKNRIP (make next RIP) instruction. Values are read from the XRSB 1302 and applied as input to a 2:1 mux 1362 along with a decoded/predicted EMU_RIP value. The output of the mux 1362 is used as the EMU_RIP in response to a MKRIP (make RIP) instruction. It should be noted that EMU_NRIP is different from EMU_RIP in that it is a "future" value of EMU_RIP. For example, a value placed in EMU_NRIP will be pushed to the RSB 1301, and upon a successful return, will become EMU_RIP in the future.

In one embodiment, the dual RSB 1205 links the guest ISA (e.g., x86) return target with internal ISA (nISA) return target. As illustrated in the example program code sequence 1370 in FIG. 13B, the nISA return targets always contain XCATNE instructions which check the physical page properties (e.g., to determine if a page boundary is crossed as discussed below). While the XCATNE instructions are employed in some embodiments described herein, the functions performed by the XCATNE instructions are generally applicable to any core (system-level) BT implementation. These instructions may check several things besides physical page properties, such as assumptions about "entry" CPU context to the return point. In one embodiment, if this x86/nISA link is broken, then XCATNE fails. The MKRIP/MKNRIP/XCALLN instructions may be folded into a single 8B macro-operation if values are encodable within the limits of the instruction. As illustrated, a decoded/predicted EMU_RIP may be compared against the return address from the XRSB 1302 and selected in the event of a misprediction (i.e., in the event that the value read from the XRSB 1302 is not the expected value).

Before explaining the operation of the dual RSB 1205 in more detail, the example call and return sequences used by the binary translator 1201 will be outlined.

Figure 14:
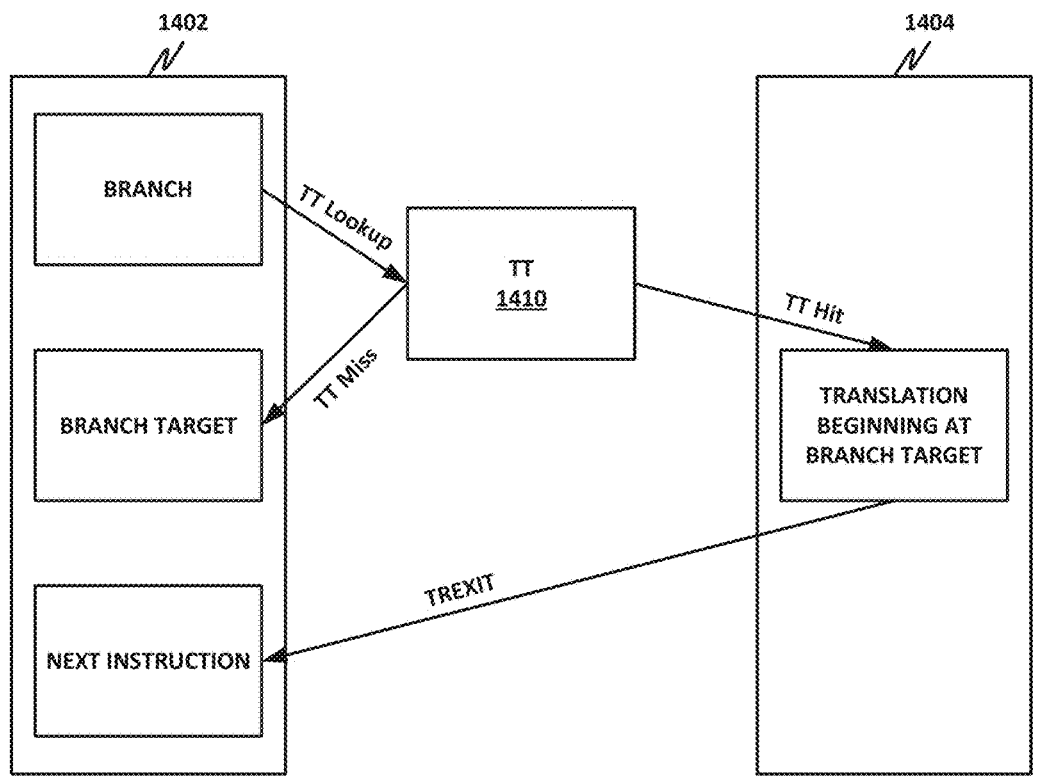
FIG. 14 is a flowchart of control flow in a DBT system according to one or more examples of the present specification.

FIG. 14 is a flowchart of control flow in a DBT processor according to one or more examples of the present specification. Binary translation starts with region formation, and the region formation routine is invoked when a hot block of code is identified. In some examples, region formation may be invoked with a seed block, and the block may then be grown to include the region starting at that seed block and including its hot successors and/or predecessors (e.g., region 1402). The output of region formation may be a control flow graph 1404 containing the identified hot block, and optionally its predecessors and successors.

It should be noted that creating an optimized translation is relatively computationally expensive, and it is therefore desirable to include only hot code in the formed region. Many binary translation region formation engines use heuristic limits to control the size of the region. Thus, in cases where a branch has two targets, the addition of the hot branch target may be prioritized over addition of the "cold" (or in other words, less frequently visited) target. Indeed, the formed region in some cases may not even include the cold target at all.

Once the region is formed, the code may be converted to an intermediate representation (IR), which may then be optimized and assembled into the host or translated ISA. This may then be installed in the TCache.

Optimizations may include classic compiler techniques like code hoisting, scheduling code from a successor block in a predecessor block after verifying that there are no data dependency violations, loop invariant code monitoring (LICM, or hoisting code that does not get changed in any iteration of a loop to outside the loop), or dead code elimination (elimination of code that does not change the state set by a preceding instruction). More aggressive optimized translations have power and performance advantages compared to the guest code.

One important feature of a DBT processor is the target table (TT) 1410, which is indexed by the guest instruction pointer (IP) of branch targets. If available, TT 1410 contains the IPs of the entry point of corresponding translations. On a TT hit, control is redirected to the translation rather than to the guest IP of the branch target. This TCache address, to which control is transferred, is called an entry point, and allows for side entry as discussed above. Because there is no information about the runtime path that leads to an entry point of translation, in some cases, optimizations like dead code elimination may not be performed to entry points.

Once a translation begins executing, control stays in the translation unit when the target of any of the control flow instructions (such as branches) in that translation are not in the same translation. This is deemed a translation exit (TREXIT). After the TREXIT, control returns to the guest code mode, and the processor checks the TT for the next block of code (e.g., does the next block CALL a procedure that has already been translated and has a side entry point). If there is a TT hit, control is dispatched to the corresponding translation. Otherwise, guest code beginning at the branch target is executed. There are other optimizations such as chaining, where control flows from one translation to another without switching to the guest code space and TT lookup.

Figure 15:
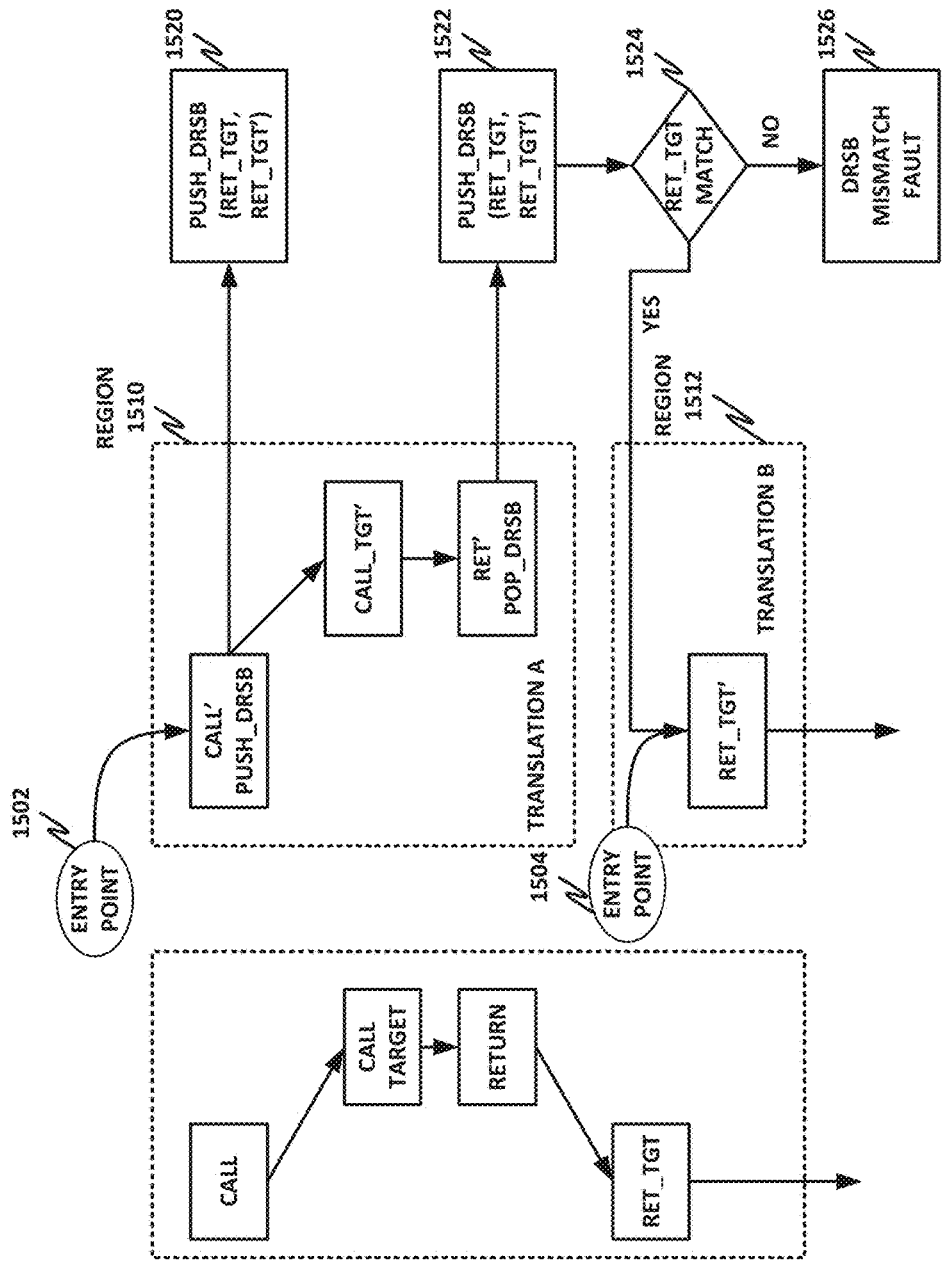
FIG. 15 is a flowchart of translation illustrating the use of a dual return stack buffer (DRSB) according to one or more examples of the present specification.

FIG. 15 is a flowchart of translation illustrating the use of a dual return stack buffer (DRSB) according to one or more examples of the present specification. The DRSB is a circular buffer with a finite number of entries. Values may be pushed onto or popped off of the DRSB stack. This buffer, which may optionally be a register or virtual register, may be thought of as a mapping between the RET_TGT instruction pointer (IP) of the translated and optimized code (i.e., IP to RET_TGT') and the RET_TGT IP of the original unoptimized guest code. Furthermore, the DRSB may be thought of as a special case of the TT, which is used for only one type of branch, specifically returns. For example, consider a translated equivalent of guest code containing a CALL/RET sequence. In this figure, the translated equivalents of the CALL, CALL_TGT, RET, and RET_TGT are called, respectively, CALL', CALL_TGT', RETURN', and RET_TGT'.

The DRSB register is populated by the execution of CALL', which has a PUSH_DRSB instruction with a tuple including (<RET_TGT, RET_TGT'>), which pushes both the guest IP of the expected target of the RET and the IP of the translated equivalent of RET_TGT (RET_TGT'), if available. On executing RETURN', (which includes a call to the instruction POP_DRSB), the DBT processor may pop this tuple from the DRSB, ensuring that the guest IP (popped from the guest program stack by the execution of the translation thus far), matches RET_TGT. The processor dispatches control to RET_TGT'. If the RET_TGT does not match the guest IP popped from the guest program stack by execution of the translation, a DRSB_MISMATCH fault may be thrown and handled by the fault handling mechanism.

DRSB may be used, in addition to dispatching to the translated code, to ensure the correctness of execution of translations containing CALL/RET pairs. Note that RET_TGT' should be a valid entry point to the TCache, or in other words, a valid entry point to the translation as illustrated in entry points 1502 and 1504.

Note that in FIG. 15, multiple entry points are defined. Specifically, entry point 1502 into TRANSLATION A, and entry point 1504 into TRANSLATION B. As discussed above, certain existing binary translation systems will not form a region across a RET_TGT. Thus, in this case, region 1510 containing TRANSLATION A of CALL, CALL_TGT, and RET, is formed. Region 1512 is formed separately, including TRANSLATION B of RET_TGT. When CALL is translated into CALL', the processor pushes RET_TGT and RET_TGT' onto the DRSB register (1520). When control reaches RET', the processor executes POP_DRSB (1522), thus popping RET_TGT and RET_TGT' from the DRSB register. If the RET_TGT is a valid match (1524), then flow continues to RET_TGT'. If the RET_TGT is not a match, then a DRSB_MISMATCH fault (1526) is thrown, and it may be handled similar to an exception.

Figure 16:
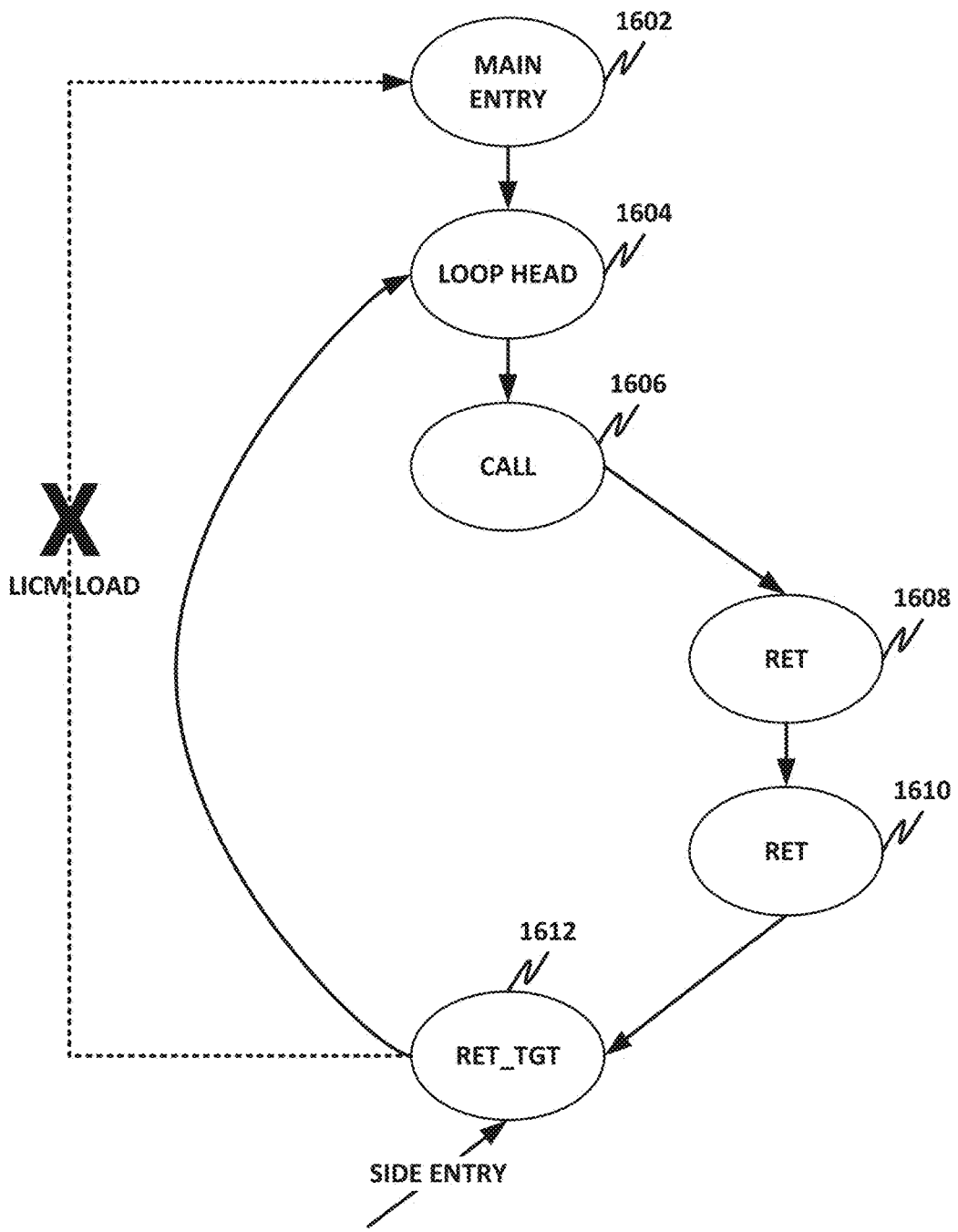
FIG. 16 is a flow diagram illustrating an example code flow according to one or more examples of the present specification.

FIG. 16 is a flow diagram illustrating an example code flow according to one or more examples of the present specification.

In this case, a main entry 1602 encounters a LOOP 1604. LOOP 1604 issues a CALL 1606 which then flows to return entries 1608 and 1610. These return control to RET_TGT 1612.

The code of FIG. 16 may be considered "hot" code that is a good candidate for translation and optimization. For example, one potential optimization is to hoist an invariant load from RET_TGT BLOCK 1612 to outside LOOP 1604.

As discussed above, the proposed optimization should satisfy the following two translation requirements.

a. Inclusion: the CALL, CALL_TGT, RET, and RET_TGT blocks (in addition to other blocks comprising the loop, if any) should be included in the same region, so that they are translated into a single translation.

b. No side entry: the RET_TGT' block and the resulting translation should not be a side entry. If there is a side entry in this block, then the load from this block that has been hoisted outside the loop will not be executed when the translation is entered through the side entry rather than the primary or main entry point 1602 of the translation. Stated otherwise, if RET_TGT' is a side entry point, then this prevents the optimization from hoisting the invariant code outside of the loop.

This illustrates a challenge that is encountered by an optimizer that is performing a translation containing a CALL/RET. However, such blocks of code may be optimized using the teachings of the present specification.

Specifically, the current specification teaches aggressive region formation (RF) for inclusion. For example, a region formation engine may use a two-phase algorithm, including an RF growth phase and an RF cleanup phase, to aggressively include CALL, CALL_TGT, RET, and RET_TGT blocks in the grown region. Note that the designation of this as a "two-phase" algorithm does not mean that it can include only these two phases, or that other phases or operations may not be performed. Rather, the "two-phase" designation indicates that at least two phases may be used, which by way of example include RF growth and RF cleanup.

In the RF growth phase, whenever a call instruction is encountered, it may be considered to mark the end of the current basic block. The RET_TGT block, which is the IP of the call instruction plus the size of the call instruction may be added to the region, but not grown (in other words, not decoded and filled out with instructions). The state of the call stack at this point may also be recorded. Then the CALL_TGT and the path from CALL_TGT to RET may be grown using a depth-first algorithm. In the depth-first algorithm, priority may be given to adding complete paths from CALL_TGT to RET rather than adding paths strictly based on the "hotness" of a block. Adding paths based strictly on hotness may potentially prevent even one complete CALL_TGT RET path from being included. Once a path to the RET_TGT is included, the RET_TGT block, which has already been added, may also be grown or, in other words, decoded and filled out with instructions.

Next RF cleanup may occur. After RF growth, the region may be cleaned up before being passed on to the next phase of translation. Specifically, the RET_TGT blocks that are not reachable because not even a single CALL_TGT RET path has been included, may be eliminated using a mark and sweep algorithm. If there are multiple CALL_TGT to RET_TGT paths and the region exceeds some heuristic limit, the "hotness" of the path may be used to eliminate less important paths.

In addition to aggressive RF, the side entry at RET_TGT 1612 may be eliminated, such as by use of a novel DRSB with a LOCAL field. As discussed earlier, a CALL' executes a PUSH_DRSB including RET_TGT and RET_TGT', while RET' executes a POP_DRSB instruction. RET_TGT' should be a valid translation entry point and in cases where RET_TGT' is in the same translation as CALL', this may form a side entry to the translation. Thus, the default PUSH_DRSB and POP_DRSB offers no guarantee that the path leading to RET_TGT' is correct in the case of side entry.

To avoid this entry, a novel DRSB register is disclosed herein, with novel variance of PUSH_DRSB and POP_DRSB instructions. Note that in certain embodiments, these instructions are executed only in the translated execution mode, and not in the guest execution mode.

In the case where a call to the RET_TGT path is fully included, the path is "fully inlined" (FI) and is translated as is described in more detail in connection with FIG. 17.

If not even a single CALL to RET_TGT path has been included, the call is translated as PUSH_DRSB and the return (which is in a different translation if translated at all) is translated as POP_DRSB. Because not even a single CALL to RET_TGT path exists in this region, there is no opportunity to perform any optimization. But with the aggressive two-phase region formation of the present specification, there is a better chance that at least one of the many CALL_TGT to RET_TGT paths is included in an optimization.

Figure 18:
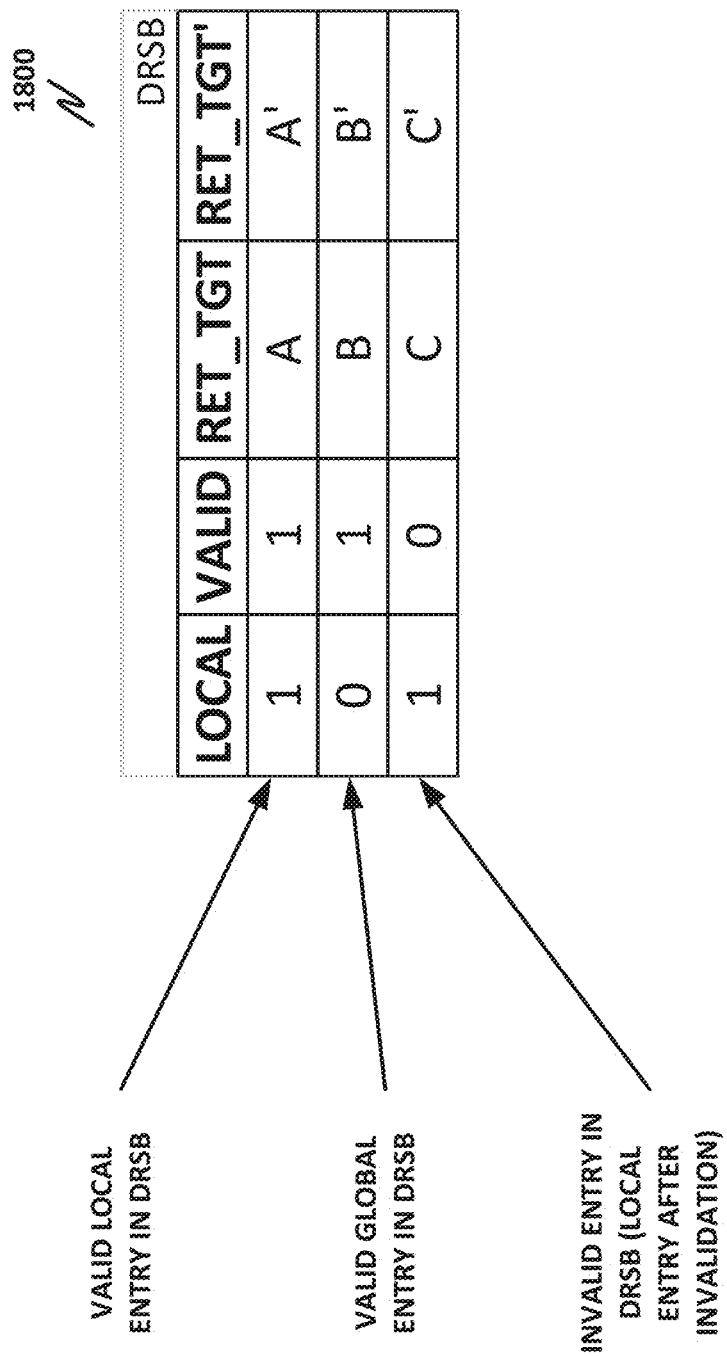
FIG. 18 is a block diagram of an example DRSB register according to one or more examples of the present specification.

If at least one CALL to RET_TGT path is included in the region (partial inlining) then the CALL/RET is translated so that the translated equivalent of RET_TGT block in this translation may be reached only locally, or in other words, from the same translation, and is not a side entry to the translation. This can be guaranteed by expanding the DRSB register to contain a local field as illustrated in FIG. 18. The local field, which may be a single bit, indicates that entry into the DRSB has been pushed by the same translation that is currently executing.

When exiting a translation, the entry pushed by CALL' in that translation, which may have set the local bit, is no longer a valid local entry. The DRSB hardware may be modified so that on exiting a translation, every DRSB entry that has the local bit set is invalidated using the existing valid field. This may be implemented, for example, by flash clearing the DRSB for all entries with a local bit set. This ensures that any valid local DRSB entry has been pushed by the same translation, and control has not exited the translation since the time the local entry was pushed to the DRSB.

Figure 17:
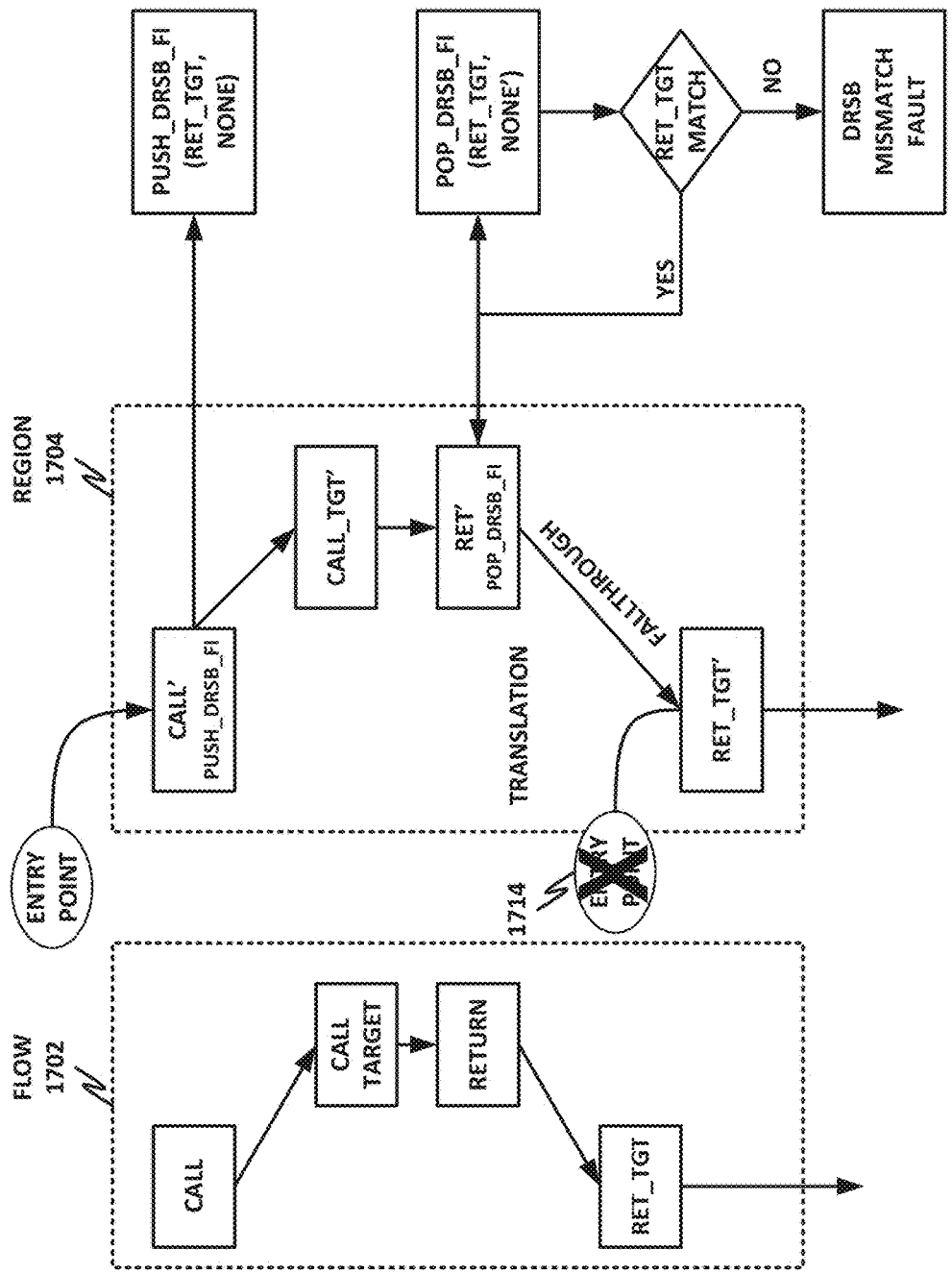
FIG. 17 is a flow diagram of a fully inlined translation according to one or more examples of the present specification.

FIG. 17 is a flow diagram of a fully inlined translation according to one or more examples of the present specification. In this example, FLOW 1702 is fully inlined or translated into region 1704. Specifically, CALL is translated to CALL', CALL_TGT is translated to CALL_TGT', RETURN is translated to RETURN', and RET_TGT is translated to RET_TGT'.

In this example, CALL' issues a PUSH_DRSB instruction. However, rather than pushing RET_TGT and RET_TGT' onto the DRSB stack, in this case RET_TGT and NONE are pushed onto the DRSB. NONE corresponds to a special addressing TCache and does not correspond to RET_TGT'. When RET' is encountered, a special POP_DRSB_FI is issued. Similar to PUSH_DRSB_FI, POP_DRSB_FI does not pop RET_TGT and RET_TGT' from the DRSB stack. Rather, POP_DRSB_FI pops RET_TGT and NONE'. This pops RET_TGT and NONE from DRSB, and uses RET_TGT to ensure the correctness of the translation. The NONE field is ignored. Control then falls through to the next block of the translation, which in this case is arranged to be RET_TGT'. This ensures that RET_TGT' is reached only from inside the translation and not from outside the translation, such as via the eliminated entry point 1714.

Cases where there are multiple call target return paths, all of which are included in the region, are handled in a similar fashion. Specifically, CALL/RET pairs are translated as PUSH_DRSB_FI and POP_DRSB_FI to achieve the same result.

FIG. 18 is a block diagram of an example DRSB register according to one or more examples of the present specification. As in existing systems, DRSB register 1800 includes fields for RET_TGT and RET_TGT'. Existing DRSB also includes a VALID field, which can be used to invalidate a DRSB entry after it is no longer valid.

Advantageously, there is also disclosed a novel local field, which may be any suitable data type, including an integer or a single bit flag. A "1" in the local field, in conjunction with a 1 in the VALID field indicates that this entry on the DRSB stack is still valid.

When exiting a translation, the entry pushed by CALL' in that translation, which might have set the local bit, is no longer valid as a local entry. Thus, upon exiting a translation, every DRSB entry that has the local bit set is invalidated. For example, this may be implemented by flash clearing the DRSB for all entries with the local bit set. This ensures that any valid local DRSB entries that have been pushed by that same translation are no longer valid after the translation is exited.

Figure 19:
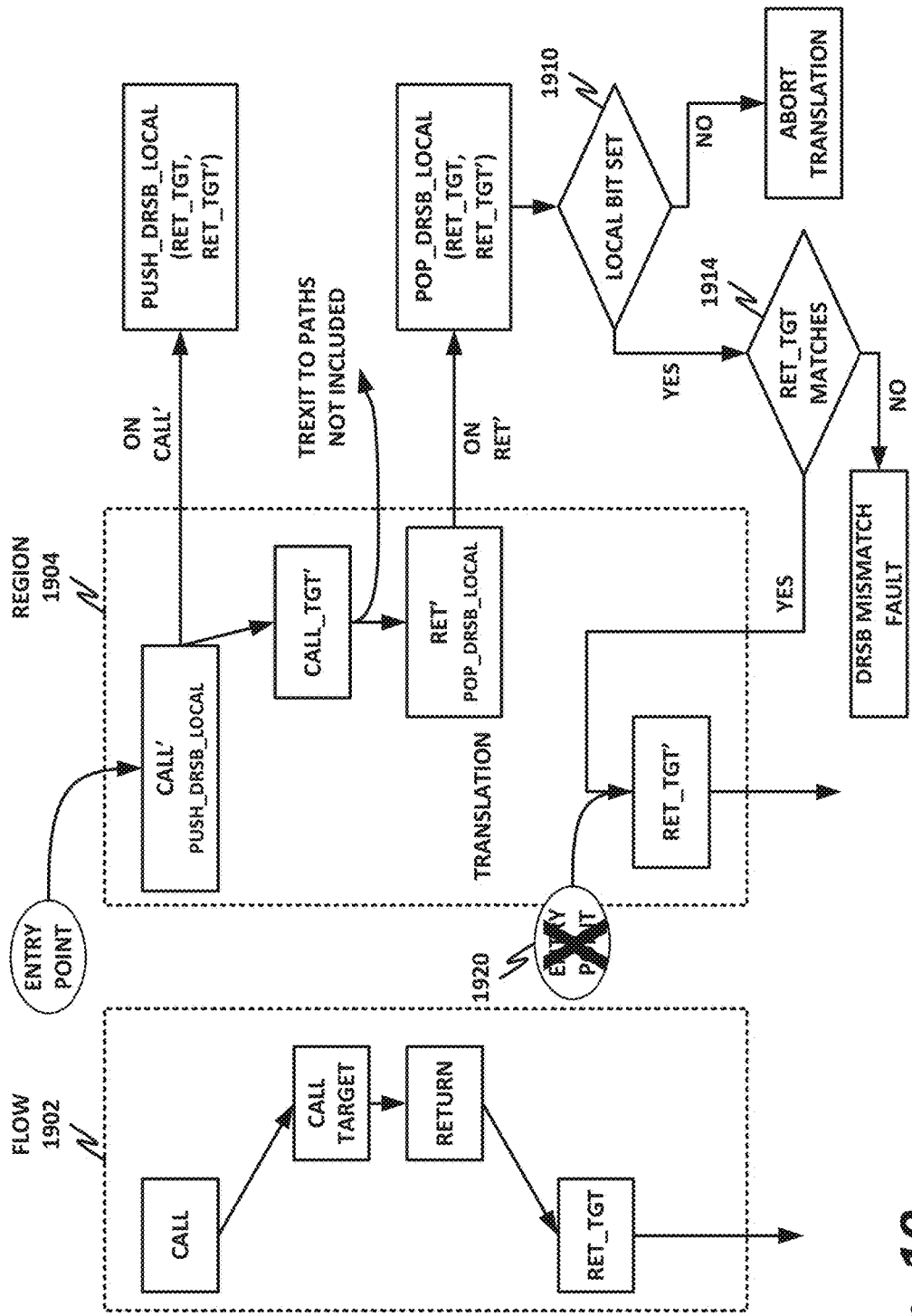
FIG. 19 is a flow diagram illustrating the use of the DRSB local bit according to one or more examples of the present specification.

FIG. 19 is a flow diagram illustrating the use of the DRSB local bit according to one or more examples of the present specification.

As before, FLOW 1902 has been translated into REGION 1904. CALL block is translated into CALL'. CALL_TGT is translated into CALL_TGT'. RET is translated into RET'. RET_TGT is translated into RET_TGT'.

In this case, CALL' uses a novel variant of the PUSH_DRSB instruction, referred to herein as PUSH_DRSB local. PUSH_DRSB local is similar to PUSH_DRSB in that it pushes RET_TGT and RET_TGT' onto the DRSB stack, but is different in that it also sets the local bit in the corresponding entry on the DRSB stack. It sets the entry to 1. A local PUSH_DRSB_FI (PUSH_DRSB_FI LOCAL) may also be provided that operates similar to PUSH_DRSB_FI, but sets the LOCAL bit for the entry to 1. Furthermore, the original PUSH_DRSB instruction may be modified so that it sets the local bit of its entry to 0.

RET' issues a POP_DRSB LOCAL instruction, which pops RET_TGT and RET_TGT' from the DRSB stack. This may be used instead of the original POP_DRSB instruction. Not only does POP_DRSB local pop the values from the DRSB register, but it also checks to see if the local bit is set. In BLOCK 1910, if the local bit is not set, then an error has been encountered, because a non-local function has tried to access the local translation (such as via invalid entry point 1920). Thus, the translation is aborted.

If the local bit is set, then in BLOCK 1914, the processor also checks to see whether the RET_TGT matches. If there is a DRSB_MISMATCH, then a DRSB_MISMATCH fault is thrown, and appropriate remedial action may be taken. If the target does match, then control returns to RET_TGT'.

Figure 20:
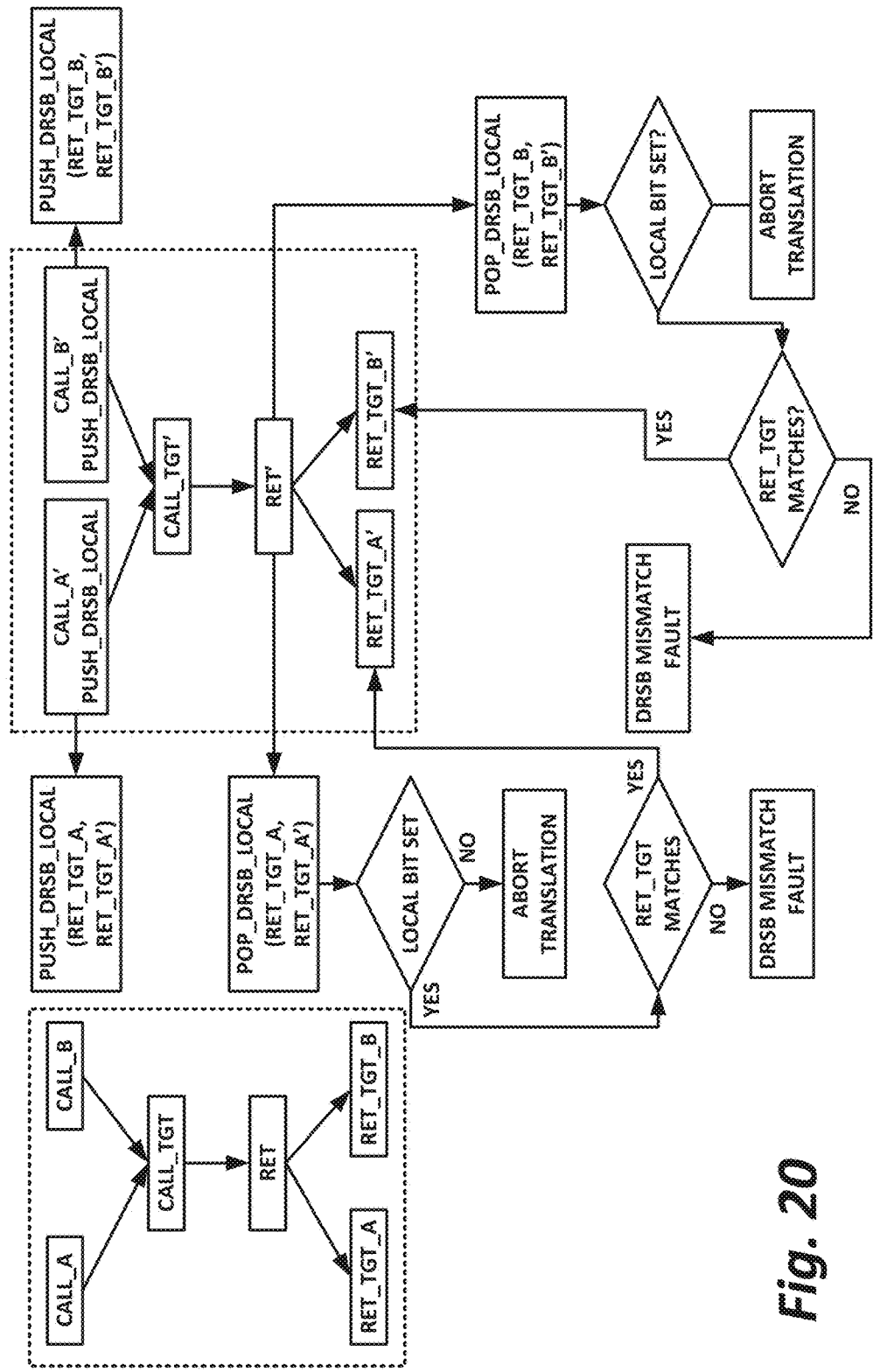
FIG. 20 illustrates an example wherein a region includes multiple call instructions to the same call target according to one or more examples of the present specification.

FIG. 20 illustrates an example wherein a region includes multiple call instructions to the same call target. In this case, it may not be possible to statically predict the control flow at the return.

For example, in this case, CALL A and CALL B both call CALL_TGT. CALL_TGT issues a return, which then flows back to RET_TGT A or RET_TGT B.

In this case, the aggressive two-phase region formation may try to include at least one call to the RET_TGT path for each of the call instructions. Assuming that both CALL A and CALL B have the paths to RET_TGT A and RET_TGT B included, this case may be handled by translating CALL and RET to use PUSH_DRSB LOCAL and POP_DRSB LOCAL.

Thus, CALL A may issue PUSH_DRSB LOCAL, which pushes RET_TGT A and RET_TGT A' onto the DRSB stack. Similarly, CALL B' issues PUSH_DRSB local, which pushes RET_TGT B and RET_TGT B' onto the DRSB stack.

The function then calls TGT', and at RET', POP_DRSB LOCAL is executed, which pops the appropriate destination from the DRSB. If control has passed out of the translation, then RET_TGT A or RET_TGT A' and RET_TGT B' will not be reached.

After the return instruction issues a POP_DRSB LOCAL instruction, then the appropriate RET_TGT and RET_TGT' addresses are popped off of the DRSB stack, and then control passes as before. First, there is a check to see whether the local bit is set, and if not, then the translation is aborted. If the local bit is set, then there is a check whether the RET_TGT matches. If it does not match, then there is a DRSB_MISMATCH fault. If the RET_TGT does match, then control flows back to RET_TGT A' or RET_TGT B', depending on which issued the original call.

For the sake of simplicity, FIG. 20 illustrates only one path from CALL_TGT to RET. However, the same solution works equally well in a case where there are multiple CALL_TGT return paths and only some of the paths are included in the region.

Note that the preceding examples assume the use of a DRSB register. However, the teachings of this specification can also be used in the cases of DBT processors that do not have a DRSB register. Specifically, in the case of no DRSB register to ensure that the guest IP pop from the guest program stack by the execution of the translation matches the value expected when the call is executed, a similar check may be performed in software. This check may be performed by holding the expected RET_TGT in either a register or a memory location when the translated equivalent of a call executes. The RET_TGT may be compared to the expected value when the return executes. Note that if this value is held in a memory location, it may not be as fast as the use of a native hardware instruction, but the comparison is still possible.

In some cases, the RET_TGT may be encoded into the comparison instruction as an immediate. In this case, the exit leading out of the translation may be trampolined through a stub that invalidates the stored value of RET_TGT, similar to the DRSB invalidating the local entry on exiting a translation. This emulates the PUSH_DRSB local behavior even in the absence of a true DRSB register.

Similarly, when a RET' executes, it may check to see if the stored value of the RET_TGT being used for comparison is invalidated (meaning that control is reached from here from a different translation and locality has been violated. This emulates the behavior of POP_DRSB LOCAL.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), field-programmable gate arrays (FPGAs), and other semiconductor chips.

As used throughout this specification, the term "processor" or "microprocessor" should be understood to include not only a traditional microprocessor (such as Intel's® industry-leading x86 and x64 architectures), but also any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field-programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, nontransitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A nontransitory storage medium herein is expressly intended to include any nontransitory special-purpose or programmable hardware configured to provide the disclosed operations, or to cause a processor to perform the disclosed operations. A nontransitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA™ programming language, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. section 112, as it exists on the date of the filing hereof, unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example, a processor, including a region formation engine to identify a region of code for translation from a guest instruction set architecture to a native instruction set architecture; and a binary translator to translate the region of code, wherein the region formation engine is to perform aggressive region formation comprising forming a region across a return (RET) instruction boundary.

There is further disclosed an example, wherein performing aggressive region formation results in two-phase region formation.

There is further disclosed an example, wherein two-phase region formation results in a region formation grow phase.

There is further disclosed an example, wherein the grow phase utilizes a depth-first algorithm, wherein priority is given to growing complete paths from a call target (CALL_TGT) to a corresponding RET.

There is further disclosed an example, wherein the depth-first algorithm grants priority to growing complete paths over frequently used code.

There is further disclosed an example, wherein the two-phase region formation involves a region formation cleanup phase.

There is further disclosed an example, wherein region formation cleanup includes eliminating call targets (CALL_TGTs) that are not reachable.

There is further disclosed an example, wherein region formation cleanup includes determining that there are multiple CALL_TGT to return target (RET_TGT) paths, determining that the region exceeds a heuristic size criterion, and eliminating less frequently used paths from the region.

There is further disclosed an example, wherein the processor further includes a dual return stack buffer (DRSB), the DRSB utilizing a RET_TGT field, a translated RET_TGT PRIME (RET_TGT') field, a VALID field, and a LOCAL field.

There is further disclosed an example, wherein the processor is to provide a PUSH_DRSB_LOCAL instruction, wherein the PUSH_DRSB_LOCAL instruction pushes an entry onto the DRSB and sets the LOCAL field.

There is further disclosed an example, wherein the processor is to provide a PUSH_DRSB_LOCAL_FI instruction for fully inlined translations, wherein the PUSH_DRSB_LOCAL_FI instruction pushes an entry onto the DRSB and sets the LOCAL field.

There is further disclosed an example, wherein the processor is to provide a POP_DRSB_LOCAL instruction, wherein the POP_DRSB_LOCAL instruction pops an entry from the DRSB and, in response to determining that the LOCAL bit is set, passes control to RET_TGT'.

There is further disclosed an example, wherein the processor is to provide a POP_DRSB_LOCAL instruction, wherein the POP_DRSB_LOCAL instruction pops an entry from the DRSB and, in response to determining that the LOCAL bit is not set, raises an error condition.

There is further disclosed an example, wherein the processor comprises a dual return stack buffer comprising a return stack buffer and a dual return stack buffer, wherein the return stack buffer is to hold one of a native return address or a translated return address.

There is further disclosed an example, wherein return stack buffer comprises a mode selection flag for selecting between the native return address and the translated return address.

There is further disclosed an example, wherein the dual extended return stack buffer is to hold a native return address.

There is further disclosed an example, wherein the processor comprises a branch predict unit and a comparator, wherein the comparator is to compare a return address from the extended return stack buffer with a predicted return address from the branch predict unit, wherein a match enables use of predicted return address.

There is further disclosed an example, wherein a system on a chip (SoC) is configured for dynamic binary translation (DBT), including: a memory; one or more cores communicatively coupled to the memory; auxiliary circuitry providing auxiliary functions to the one or more cores, wherein the one or more cores form a processor block, including: a region formation engine to identify a region of code for translation from a guest instruction set architecture to a native instruction set architecture; and a binary translator to translate the region of code, wherein the region formation engine is to perform aggressive region formation including forming a region across a return (RET) instruction boundary.

There is further disclosed an example of an SoC, wherein performing aggressive region formation results in two-phase region formation, and wherein the two-phase region formation includes a region formation grow phase.

There is further disclosed an example of an SoC, wherein the grow phase involves a depth-first algorithm, wherein priority is given to growing complete paths from a call target (CALL_TGT) to a corresponding RET, and the depth-first algorithm grants priority to growing complete paths over frequently used code.

There is further disclosed an example of an SoC, wherein performing aggressive region formation results in two-phase region formation, and wherein the two-phase region formation includes a region formation cleanup phase.

There is further disclosed an example of an SoC, wherein region formation cleanup includes eliminating CALL_TGTs that are not reachable, and wherein the region formation cleanup involves determining that there are multiple CALL_TGT to return target (RET_TGT) paths, determining that the region exceeds a heuristic size criterion, and eliminating less frequently used paths from the region.

There is further disclosed an example of an SoC, wherein the SoC further includes a dual return stack buffer (DRSB), the DRSB including a RET_TGT field, a translated RET_TGT PRIME (RET_TGT') field, a VALID field, and a LOCAL field.

There is further disclosed an example of an SoC, wherein the SoC is to provide a PUSH_DRSB_LOCAL instruction, wherein the PUSH_DRSB_LOCAL instruction pushes an entry onto the DRSB and sets the LOCAL field.

There is further disclosed an example of an SoC, wherein the SoC is to provide a PUSH_DRSB_LOCAL_FI instruction for fully inlined translations, wherein the PUSH_DRSB_LOCAL_FI instruction pushes an entry onto the DRSB and sets the LOCAL field.

There is further disclosed an example of an SoC, wherein the SoC is to provide a POP_DRSB_LOCAL instruction, wherein the POP_DRSB_LOCAL instruction pops an entry from the DRSB and, in response to determining that the LOCAL bit is set, passes control to RET_TGT'.

There is further disclosed an example of an SoC, wherein the SoC is to provide a POP_DRSB_LOCAL instruction, wherein the POP_DRSB_LOCAL instruction pops an entry from the DRSB and, in response to determining that the LOCAL bit is not set, raises an error condition.

There is further disclosed an example of a method of providing dynamic binary translation for a processor, including: performing region formation involving identifying a region of code for translation from a guest instruction set architecture to a native instruction set architecture; and performing binary translation to translate the region of code; and, wherein region formation includes aggressive region formation resulting in forming a region across a return (RET) instruction boundary.

There is further disclosed an example of a method, wherein aggressive region formation includes a region formation grow phase and a region formation cleanup phase.

There is further disclosed an example of a method, wherein accessing a dual return stack buffer (DRSB) register involves a LOCAL field.

What is claimed is:

1. A processor, comprising:
a region formation engine to perform aggressive region formation of a region of code for translation from a guest instruction set architecture code to a translated instruction set architecture code,
wherein the aggressive region formation comprises forming the region of code across a boundary of a return (RET) instruction; and
a binary translator to:
translate the region of code; and
prevent a side entry into the translated region of code at a translated return target (RET_TGT') included in the translated region of code, wherein the RET_TGT' is translated from a return target (RET_TGT) in the guest instruction set architecture code, and
wherein the side entry is prevented based on an indication mapped to an instruction pointer of the RET_TGT.

2. The processor of claim 1, wherein performing aggressive region formation comprises two-phase region formation.

3. The processor of claim 2, wherein two-phase region formation comprises a region formation grow phase.

4. The processor of claim 3, wherein the grow phase comprises a depth-first algorithm, wherein priority is given to growing complete paths from a call target (CALL_TGT) to a corresponding return (RET) instruction.

5. The processor of claim 4, wherein the depth-first algorithm grants priority to growing complete paths over frequently used code.

6. The processor of claim 2, wherein the two-phase region formation comprises a region formation cleanup phase.

7. The processor of claim 6, wherein region formation cleanup comprises eliminating call targets (CALL_TGTs) that are not reachable.

8. The processor of claim 6, wherein region formation cleanup comprises determining that there are multiple CALL_TGT to return target (RET_TGT) paths, determining that the region exceeds a heuristic size criterion, and eliminating less frequently used paths from the region.

9. The processor of claim 1, wherein the processor further comprises a dual return stack buffer (DRSB), the DRSB comprising a RET_TGT field, a translated RET_TGT PRIME (RET_TGT') field, a VALID field, and a LOCAL field to store the indication, wherein the RET_TGT' field contains a RET_TGT' instruction pointer corresponding to the translated RET_TGT.

10. The processor of claim 9, wherein the processor is to provide a PUSH_DRSB_LOCAL instruction, wherein the PUSH_DRSB_LOCAL instruction pushes an entry onto the DRSB and sets the LOCAL field.

11. The processor of claim 9, wherein the processor is to provide a PUSH_DRSB_LOCAL_FI instruction for fully inlined translations, wherein the PUSH_DRSB_LOCAL_FI instruction pushes an entry onto the DRSB and sets the LOCAL field.

12. The processor of claim 9, wherein the processor is to provide a POP_DRSB_LOCAL instruction, wherein the POP_DRSB_LOCAL instruction pops an entry from the DRSB and, in response to determining that the LOCAL bit is set, passes control according to the RET_TGT' instruction pointer.

13. The processor of claim 9, wherein the processor is to provide a POP_DRSB_LOCAL instruction, wherein the POP_DRSB_LOCAL instruction pops an entry from the DRSB and, in response to determining that the LOCAL bit is not set, raises an error condition.

14. A system on a chip (SoC) configured for dynamic binary translation (DBT), comprising:
a memory;
one or more cores communicatively coupled to the memory;
auxiliary circuitry providing auxiliary functions to the one or more cores,
wherein the one or more cores comprise a processor block, comprising:
a region formation engine to perform aggressive region formation for a region of code to be translated from a guest instruction set architecture code to a translated instruction set architecture code, wherein the aggressive region formation comprises forming the region of code across a boundary of a return (RET) instruction; and
a binary translator to:
translate the region of code; and
prevent a side entry into the translated region of code at a translated return target (RET_TGT') included in the translated region of code,
wherein the RET_TGT' is translated from a return target (RET_TGT) in the guest instruction set architecture code, and wherein the side entry is prevented by mapping an indication to an instruction pointer of the RET_TGT.

15. The SoC of claim 14, wherein performing aggressive region formation comprises two-phase region formation, and wherein the two-phase region formation comprises a region formation grow phase.

16. The SoC of claim 15, wherein the grow phase comprises a depth-first algorithm, wherein priority is given to growing complete paths from a call target (CALL_TGT) to a corresponding return (RET) instruction, and the depth-first algorithm grants priority to growing complete paths over frequently used code.

17. The SoC of claim 16, wherein performing aggressive region formation comprises two-phase region formation, and wherein the two-phase region formation comprises a region formation cleanup phase.

18. The SoC of claim 17, wherein region formation cleanup comprises eliminating CALL_TGTs that are not reachable, and wherein the region formation cleanup comprises determining that there are multiple CALL_TGT to return target (RET_TGT) paths, determining that the region exceeds a heuristic size criterion, and eliminating less frequently used paths from the region.

19. The SoC of any of claim 15, wherein the SoC further comprises a dual return stack buffer (DRSB), the DRSB comprising a RET_TGT field, a translated RET_TGT PRIME (RET_TGT') field, a VALID field, and a LOCAL field to store the indication, wherein the RET_TGT' field contains a RET_TGT' instruction pointer corresponding to the translated RET_TGT.

20. The SoC of claim 19, wherein the SoC is to provide a PUSH_DRSB_LOCAL instruction, wherein the PUSH_DRSB_LOCAL instruction pushes an entry onto the DRSB and sets the LOCAL field.

21. The SoC of claim 19, wherein the SoC is to provide a PUSH_DRSB_LOCAL_FI instruction for fully inlined translations, wherein the PUSH_DRSB_LOCAL_FI instruction pushes an entry onto the DRSB and sets the LOCAL field.

22. The SoC of claim 19, wherein the SoC is to provide a POP_DRSB_LOCAL instruction, wherein the POP_DRSB_LOCAL instruction pops an entry from the DRSB and, in response to determining that the LOCAL bit is set, passes control according to the RET_TGT' instruction pointer.

23. A method of providing dynamic binary translation for a processor, comprising:
  performing region formation comprising identifying a region of code for translation from a guest instruction set architecture code to a translated instruction set architecture code, comprising aggressive region formation comprising:
    forming the region of code across a boundary of a return (RET) instruction;
    performing binary translation to translate the region of code; and
    preventing a side entry into the translated region of code at a translated return target (RET_TGT') included in the translated region of code,
    wherein the RET_TGT' is translated from a return target (RET_TGT) in the guest instruction set architecture code, and wherein the side entry is prevented based on an indication mapped to an instruction pointer of the RET_TGT.

24. The method of claim 23, wherein aggressive region formation comprises a region formation grow phase, and a region formation cleanup phase.

25. The method of claim 24, further comprising accessing a dual return stack buffer (DRSB) register comprising a LOCAL field.

* * * * *